US012132732B2

(12) United States Patent
Ping et al.

(10) Patent No.: US 12,132,732 B2
(45) Date of Patent: Oct. 29, 2024

(54) DYNAMIC ALLOCATION OF NETWORK SLICE-SPECIFIC CREDENTIALS

(71) Applicant: Nokia Technologies Oy, Espoo (FI)

(72) Inventors: Jing Ping, Chengdu (CN); Iris Adam, Munich (DE); Anatoly Andrianov, Schaumburg, IL (US)

(73) Assignee: NOKIA TECHNOLOGIES OY

( * ) Notice: Subject to any disclaimer, the term of this patent is extended or adjusted under 35 U.S.C. 154(b) by 544 days.

(21) Appl. No.: 17/621,971

(22) PCT Filed: Jun. 24, 2019

(86) PCT No.: PCT/CN2019/092583
§ 371 (c)(1),
(2) Date: Dec. 22, 2021

(87) PCT Pub. No.: WO2020/257986
PCT Pub. Date: Dec. 30, 2020

(65) Prior Publication Data
US 2022/0263826 A1  Aug. 18, 2022

(51) Int. Cl.
*H04L 9/40*   (2022.01)
(52) U.S. Cl.
CPC ........ *H04L 63/0892* (2013.01); *H04L 63/083* (2013.01); *H04L 63/101* (2013.01); *H04L 63/20* (2013.01)
(58) Field of Classification Search
CPC ..... H04W 12/60; H04W 12/35; H04W 12/04; H04L 41/5009; H04L 63/068;
(Continued)

(56) References Cited
U.S. PATENT DOCUMENTS 10,212,589 B2 * 2/2019 Senarath ............... H04M 15/88
10,841,084 B2 * 11/2020 Lee ........................ H04L 63/102
(Continued)

FOREIGN PATENT DOCUMENTS

| CN | 106717044 A | 5/2017 |
| CN | 107615732 A | 1/2018 |

(Continued)

OTHER PUBLICATIONS

ETSI TS 123 003 V14.3.0 (May 2017) Digital cellular telecommunications system (Phase 2+) (GSM); Universal Mobile Telecommunications System (UMTS); Numbering, addressing and identification(3GPP TS 23.003 version 14.3.0 Release 14) (Year: 2017).*

(Continued)

*Primary Examiner* — Benjamin A Kaplan
(74) *Attorney, Agent, or Firm* — Robert P. Michal, Esq.; Carter, DeLuca & Farrell LLP

(57) ABSTRACT

A credential manager imports credentials for a network slice in response to deployment of the network slice. The credentials are not known to other network slices. A repository is configured to store the credentials and protect the credentials based on credential protection policies that are defined by a service profile of the network slice. The repository is implemented in the credential manager, an authentication, authorization, and accounting (AAA) server, or other location. Properties of the credentials are modified in response to a modification trigger and the credentials are withdrawn in response to a withdrawal trigger.

20 Claims, 13 Drawing Sheets

(58) Field of Classification Search
CPC . H04L 63/101; H04L 63/083; H04L 63/0892; H04L 63/20; H04L 41/40; H04L 41/0895
USPC ............................................................ 726/4
See application file for complete search history.

(56) References Cited

U.S. PATENT DOCUMENTS

| | | | |
|---|---|---|---|
| 2017/0318568 | A1 | 11/2017 | Nimbalker et al. |
| 2018/0317086 | A1 | 11/2018 | Ben Henda et al. |
| 2019/0159126 | A1 | 5/2019 | Kadiri et al. |
| 2019/0182875 | A1 | 6/2019 | Talebi Fard et al. |

FOREIGN PATENT DOCUMENTS

| | | | |
|---|---|---|---|
| CN | 107925871 | A | 4/2018 |
| CN | 108141756 | A | 6/2018 |
| CN | 108347729 | A | 7/2018 |
| CN | 108463969 | A | 8/2018 |
| CN | 109151907 | A | 1/2019 |
| CN | 109792457 | A | 5/2019 |
| WO | 2018/013925 | A1 | 1/2018 |
| WO | 2018/053271 | A1 | 3/2018 |
| WO | 2018/137873 | A1 | 8/2018 |
| WO | 2019/004929 | A2 | 1/2019 |
| WO | 2019/020171 | A1 | 1/2019 |

OTHER PUBLICATIONS

"3rd Generation Partnership Project; Technical Specification Group Services and System Aspects; Security architecture and procedures for 5G system (Release 15)", 3GPP TS 33.501, V15.4.0, Mar. 2019, pp. 1-187.
"3rd Generation Partnership Project;Technical Specification Group Services and System Aspects; Study on Enhancement of Network Slicing (Release 16)", 3GPP TR 23.740, V16.0.0, Dec. 2018, pp. 1-70.
"3rd Generation Partnership Project; Technical Specification Group Services and System Aspects; Security Aspects; Study on Security Aspects of Enhanced Network Slicing (Release 16)", 3GPP TR 33.813, V0.4.0, May 2019, pp. 1-27.
"3rd Generation Partnership Project; Technical Specification Group Services and System Aspects; System Architecture for the 5G System;Stage 2 (Release 16)", 3GPP TS 23.501, V16.1.0, Jun. 2019, pp. 1-368.
"3rd Generation Partnership Project; Technical Specification Group Services and System Aspects; Telecommunication management; Study on management and orchestration of network slicing for next generation network (Release 15)", 3GPP TR 28.801, V15.1.0, Jan. 2018, pp. 1-75.
"3rd Generation Partnership Project; Technical Specification Group Services and System Aspects;Management and orchestration; Architecture framework (Release 16)", 3GPP TS 28.533, V16.0.0, Jun. 2019, pp. 1-26.
International Search Report and Written Opinion received for corresponding Patent Cooperation Treaty Application No. PCT/CN2019/092583, dated Mar. 26, 2020, 9 pages.
Extended European Search Report received for corresponding European Patent Application No. 19937113.9, dated Mar. 24, 2023, 22 pages.
"Efficient CA design", 3GPP TSG RAN WG1 Meeting RAN1#96bis, R1-1904722, Agenda: 7.2.13.4, Nokia, Apr. 8-12, 2019, 4 pages.
Extended European Search Report received for corresponding European Patent Application No. 19934414.4, dated Mar. 6, 2023, 8 pages.
Office Action received for corresponding Chinese Patent Application No. 201980097819.5, dated Jan. 26, 2024, (8 pages), English Translation (5 pages) 13 total pages.
"pCR_amendment to security requirements and threats for key issue #8.3", 3GPP TSG SA WG3 (Security) Adhoc Meeting on FS_NSA, S3-161374, Agenda : 4.4, Huawei, Sep. 27-29, 2016, 2 pages.
"Declaring the public/private key pairs (e.g in EAP-TLS) should be stored in AUSF instead of ARPF", 3GPP TSG SA WG3 (Security) Meeting #86, S3-170128, Agenda : 8.4.2, Huawei, Feb. 6-10, 2017, 2 pages.
Notice of Allowance received for corresponding Chinese Patent Application No. 201980097819.5, dated Jun. 3, 2024, (5 pages), English translation (2 pages), 7 pages total.
"RAN Support for Core Network Slicing", RAN WG3 Meeting #93, R3-161759, Agenda : 10.2.2, Huawei, Aug. 22-26, 2016, pp. 1-13.
Ying et al., "Review of 5G mobile communication technology standard", Journal on Communications, 2018, pp. 1-8, English abstract submitted.
Binhong, "Discussion on the Slice Management Architecture Design for 5G Network", Mobile Communications, vol. 42, No. 10, Oct. 2018, pp. 13-18, English abstract submitted.
Rui et al., "Survey of 5G network slicing", Journal of Nanjing University of Posts and Telecommunications (Natural Science Edition), vol. 38, No. 5, Oct. 2018, pp. 19-27, English abstract submitted.
"3rd Generation Partnership Project; Technical Specification Group Services and System Aspects; Study on Architecture for Next Generation System (Release 14)", 3GPP TR 23.799, V1.2.0, Nov. 2016, pp. 1-546.

\* cited by examiner

DYNAMIC ALLOCATION OF NETWORK SLICE-SPECIFIC CREDENTIALS

RELATED APPLICATION

This application was originally filed as PCT Application No. PCT/CN2019/092583, filed on Jun. 24, 2019, of which is incorporated herein by reference in its entirety.

BACKGROUND

Upcoming generations of communication systems, such as Fifth Generation (5G) communication systems and Industry 4.0, are expected to enable applications such as virtual reality, augmented reality, reliable remote operation of machines, factory automation, network-assisted control of traffic and self-driving vehicles, and the cellular "Internet of Things (IoT)" that supports internetworking of physical devices such as appliances, vehicles, buildings, and other items that are embedded with electronics, software, sensors, actuators, and network connectivity that enable the devices to collect and exchange data over the Internet. 5G communication systems implement network slicing to provide connectivity and data processing that is tailored to specific requirements, e.g., as set forth in a service level agreement (SLA) negotiated with a mobile network operator (MNO). The Third Generation Partnership Project (3GPP) Technical Specification (TS) 23.501, which is incorporated herein by reference in its entirety, defines a network slice as a logical network that provides specific network capabilities and network characteristics. In some cases, the network slice is implemented as an independent end-to-end logical network that runs on a shared physical infrastructure and provides connectivity at a negotiated service quality. Different types of network slices are characterized by different technical attributes, requirements, expectations, or capabilities such as latency, data security, energy efficiency, mobility, massive connectivity, reachability, quality-of-service (QoS), and throughput.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, an apparatus is provided. Some embodiments of the apparatus include a processor configured to import credentials for a network slice in response to deployment of the network slice. The credentials are not known to other network slices. The apparatus also includes a repository configured to store the credentials and protect the credentials based on credential protection policies that are defined by a service profile of the network slice.

Some embodiments of the processor are implemented in a credential manager and the repository is implemented in at least one of the credential manager and an authentication, authorization, and accounting (AAA) server.

In some embodiments, the credentials stored in the repository are protected according to at least one of encryption, access control, storage isolation, and integrity protection policies associated with a Single-Network Slice Selection Assistance Information (S-NSSAI) as defined in the service profile of the network slice.

In some embodiments, the processor is configured to modify at least one property of the credentials in response to a modification trigger.

In some embodiments, the modification trigger includes at least one of compromising the credentials, loss of the credentials, expiration of the credentials, a change in a security state or environment of the network slice, a change in a regulation or policy.

In some embodiments, the property of the credentials includes at least one of a value of the credentials, the credential protection policy, usage of the credentials for at least one of authentication and protecting traffic associated with the S-NSSAI, and subscriber authentication flags associate with the S-NSSAI that indicate whether primary or secondary authentication is used.

In some embodiments, the processor is configured to trigger, in response to the modification trigger, modification of at least one of network slice authentication flags, traffic protection options on a network function, and the processor is configured to trigger the modification of the credentials on a user equipment in response to the modification trigger.

In some embodiments, the processor is configured to withdraw the credentials in response to a withdrawal trigger.

In some embodiments, the withdrawal trigger includes at least one of termination of the network slice, disassociation of the S-NSSAI from the network slice, and disassociation of the tenant from the network slice.

In some embodiments, the processor is configured to trigger, in response to the withdrawal trigger, update of at least one of network slice authentication flags, traffic protection options, and wherein the processor is configured to trigger removal of the credentials from a user equipment in response to the withdrawal trigger.

In some embodiments, the credential manager triggers configuration of at least one of network slice authentication flags, traffic protection options on a network function, and wherein the credential manager provides the credentials to a user equipment to access services via the network slice.

In some embodiments, a method is provided. The method includes importing credentials for a network slice in response to deployment of the network slice. The credentials are not known to other network slices. The method also includes storing the credentials in a repository and protecting the credentials based on credential protection policies that are defined by a service profile of the network slice.

In some embodiments, the repository is implemented in at least one of a credential manager and an authentication, authorization, and accounting (AAA) server.

In some embodiments, protecting the credentials includes protecting the credentials according to at least one of encryption, access control, storage isolation, and integrity protection policies associated with a Single-Network Slice Selection Assistance Information (S-NSSAI) defined in the service profile of the network slice.

Some embodiments of the method include triggering configuration of at least one of network slice authentication flags, traffic protection options on a network function and providing the credentials to a user equipment to access services via the network slice.

Some embodiments of the method include modifying at least one property of the credentials in response to a modification trigger.

In some embodiments, the modification trigger includes at least one of compromising the credentials, loss of the credentials, expiration of the credentials, a change in a security state or environment of the network slice, a change in a regulation or policy.

In some embodiments, the property of the credentials includes at least one of a value of the credentials, the credential protection policy, usage of the credentials for at least one of authentication and protecting traffic associated with a Single-Network Slice Selection Assistance Information (S-NSSAI) and subscriber authentication flags associated with the S-NSSAI that indicate whether primary or secondary authentication is used.

Some embodiments of the method include triggering, in response to the modification trigger, modification of at least one of network slice authentication flags, traffic protection options on a network function and triggering the modification of the credentials from a user equipment in response to the modification trigger.

Some embodiments of the method include withdrawing the credentials in response to a withdrawal trigger.

In some embodiments, the withdrawal trigger includes at least one of termination of the network slice, disassociated of the S-NSSAI from the network slice, and disassociated of the tenant from the network slice.

Some embodiments of the method include triggering, in response to the withdrawal trigger, modification of at least one of network slice authentication flags, traffic protection options on a network function and triggering removal of the credentials from a user equipment in response to the withdrawal trigger.

In some embodiments, an apparatus is provided. The apparatus includes at least one processor and at least one memory including computer program code. The at least one memory and the computer program code are configured to, with the at least one processor, cause the apparatus at least to perform importing credentials for a network slice to an authentication, authorization, and accounting (AAA) server in response to deployment of the network slice, wherein the credentials are not known to other network slices, storing the credentials in a repository, and protecting the credentials based on credential protection policies that are defined by a service profile of the network slice.

In some embodiments, the at least one memory and the computer program code are configured to, with the at least one processor, cause the apparatus at least to perform modifying at least one property of the credentials in response to a modification trigger and withdrawing the credentials in response to a withdrawal trigger.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
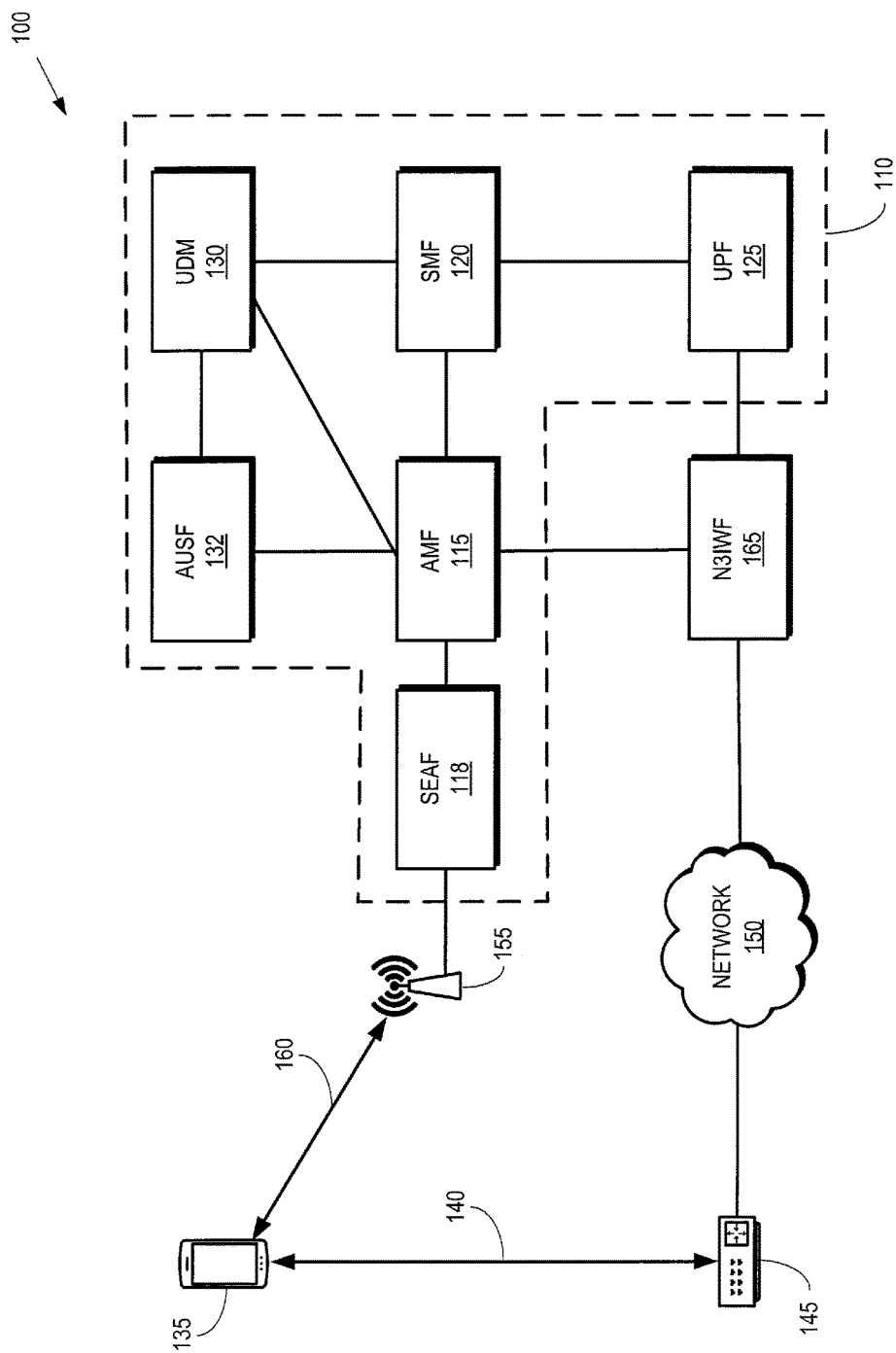
FIG. 1 is a block diagram of a network system that supports primary authentication and authorization of subscribers according to some embodiments.

A network slice provides user plane or control plane functions to support wireless connectivity with user equipment via the network slice. User equipment can concurrently access multiple network slices and a single network slice can provide services to multiple user equipment depending on the isolation requirements of the user equipment. Some embodiments of user equipment provide Network Slice Selection Assistance Information (NSSAI) parameters to the 5G network to assist in selection of a slice instance for the user equipment. The 5G network can also use device capabilities, subscription information and local operator policies to do the selection. An NSSAI is a collection or list of smaller components, indicated by Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices. A single NSSAI may lead to the selection of several slices, which are identified by corresponding S-NSSAIs.

A mandatory primary authentication is performed by an MNO, e.g., in response to a serving network receiving an NSSAI that indicates one or more network slices requested by a user equipment. Some embodiments of a 5G Core network use a subscribed S-NSSAI as a default identifier when the user equipment doesn't send an NSSAI. The primary authentication and key agreement (AKA) procedure enables mutual authentication between the user equipment and the serving network, which provides credentials including key material to support secure communication between the serving network and the user equipment. Thus, primary authentication provides subscription-specific session credentials for base stations serving the user equipment. The credentials are stored in a unified data manager (UDM) in a core network of the 5G network. Conventional primary authentication in a 5G network only supports logical isolation between subscribers (or user equipment) and does not support logical isolation between network slices because multiple network slices can be associated with a single subscriber and a single network slice can be associated with multiple subscribers. Although a secondary authentication can be performed with slice-specific credentials, current standards do not establish techniques for managing the slice-specific credentials. Furthermore, 5G mobile networks enable fast deployment of new services, updates of existing services and termination of outdated services based on network slicing and other technology. Therefore, dynamic slice-specific credential management is essential to adapt the dynamics of network slicing.

FIGS. 2-13 disclose a credential manager that provides management of slice-specific credentials for MNOs or tenants of network slices. For example, an operator can instantiate or be allocated three network slices. Two of the network slices are allocated to a vertical customer of the operator (e.g., a tenant) and one of the network slices is reserved to the operator for streaming services of the operator's subscribers. The operator can define different S-NSSAIs for the different levels of subscribers, e.g., the vertical customers and the operator's subscribers. In some embodiments, the credential manager can be part of a network slice management function/communication service management function (NSMF/CSMF). The credential manager imports credentials including at least slice-specific key material (e.g., from an administrator) in response to allocating a network slice to a tenant such as a vertical customer or an MNO. The credentials are stored in a repository such as the credential manager or an authentication, authorization, and accounting (AAA) server. In some embodiments, the credentials are identified by an S-NSSAI that are planned by the operator according to a network blueprint. Credentials for multiple tenants can be grouped per tenant per S-NSSAI if multiple tenants are sharing the same network slice. The stored credentials are protected according to credential protection policies that are defined in service profiles of the network slice. For example, the credentials can be encrypted according to an encryption procedure associated with a S-NSSAI defined in a service profile of the network slice, which is provided to a credential repository, such as AAA server, by the credential manager. Other credential protection techniques can be used including access control, storage isolation, and integrity protection. Using slice-specific credentials facilitates slice-specific authentication with or without primary authentication, as well as facilitating traffic isolation and protection on a per-slice basis.

Some embodiments of the credential manager update or modify properties of the credentials in response to a trigger such as detecting compromised or lost credentials, expiration of the credentials, a change in a security state/environment of the network slice, changes in regulations or policies, a change in access information for network functions such as the AAA server, the like. The properties include the value of the credential, the credential protection policy, usage of the credentials (e.g., only for authentication or also for protecting traffic associated with the network slice), subscriber authentication flags that indicate whether primary or secondary authentication is used, and the like. The updates or modifications include changing the properties of the credentials. For example, the credential protection policy can be modified to change a weak encryption scheme to a stronger encryption scheme in response to detecting anomalies in accesses to the credentials. For another example, slice-specific key material can be replaced and redistributed in response to an indication that credentials for the network slice have been compromised. For yet another example, the UDM can be updated to change access information for the AAA server in response to a change in a configuration of the AAA server. The access information includes an address of the AAA server, credentials of the AAA server, and the like. For yet another example, the updates can include requesting encryption of air or transport traffic with slice specific keys or adding/removing secondary authentication according to new security policies. Some embodiments of the credential manager withdraw the credentials in response to triggers such as termination of the slice, dissociating the supported S-NSSAI from the slice, dissociating the tenant from the slice, and the like. Some embodiments of credential manager and the AAA server are implemented in the network operator domain and other embodiments of credential manager and the AAA server are implemented in the service provider domain.

FIG. 1 is a block diagram of a network system 100 that supports primary authentication and authorization of subscribers according to some embodiments. The network system 100 provides network services including mobile and fixed access to subscribers according to Fifth Generation (5G).

The network system 100 includes a core network 110 of the 5G network system 100. The core network 110 includes an access and mobility management function (AMF) 115 that manages access control and mobility for devices in the network system 100. Some embodiments of the AMF 115 handle registration management (RM) and connection management (CM) tasks. Some embodiments of the network system 100 include a Security Anchor Function (SEAF) 118 that acts as a "middleman" during the authentication process between user equipment and a home network. The SEAF 118 can reject an authentication from the user equipment, but it relies on the home network to accept the authentication of the user equipment.

A session management function (SMF) 120 sets up and manages sessions in the network system 100 according to network policies. An association between user equipment and the core network 110 can be represented as a packet data unit (PDU) session that is managed by the SMF 120. The PDU session supports data connectivity between user equipment and a data network. The SMF 120 generates messages including NAS containers for transmission to the AMF 115. The core network 110 also includes one or more user plane functions (UPF) 125 that can be deployed in the network system 100 to provide services to users of the network system 100. The core network 110 further includes a unified data manager (UDM) 130 that processes credentials, location management, subscription management, and the like. The UDM 130 stores data including user subscription data, such as subscription identifiers, security credentials, access and mobility related subscription data, and session related subscription data. An authentication server function (AUSF) 132 is included to facilitate 5G security processes, as discussed herein. Some embodiments of the core network 110 include other functionality such as a policy control function and a network function repository function, which are not shown in FIG. 1 in the interest of clarity. Some embodiments of the core network 110 are implemented using network function virtualization and software defined networking, as discussed herein. For example, different network slices can be used to instantiate different instances of the AMF 115, the SEAF 118, the SMF 120, the UPF 125, the UDM 130, or the AUSF 132 for different users or devices. Each PDU session is part of one network slice.

In the illustrated embodiment, a user equipment 135 has a wireless connection 140 to an access point 145. The wireless connection 140 is a non-3GPP access type such as a Wi-Fi connection. The access point 145 has a wired (non-3GPP) connection to network 150 that is capable of carrying Internet protocol (IP) traffic such as an Ethernet network. Some embodiments of the wired connection use line termination devices such as a digital subscriber line access multiplexer (DSLAM) or a gigabit passive optical network (GPON). The network system 100 can therefore provide the user equipment 135 with access to the core network 110 via a non-3GPP access type. The network system 100 can also provide the user equipment 135 with mobile access to the core network 110, e.g., via a radio access network 155 that is connected to the AMF 115 over a corresponding interface such as an N2 interface. The radio access network 155 is also connected to the UPF 125 by a corresponding interface such as an N3 interface, which is not shown in FIG. 1 in the interest of clarity. The radio access network 155 provides wireless connectivity to the user equipment 135 via a wireless connection 160. The wireless connection 160 provides wireless connectivity according to a 3GPP access type.

An interworking function 165 is disposed between the network 140 and the core network 110. The interworking function 165 can also be referred to as a non-3GPP interworking function (N3IWF) because the interworking function 165 is used to connect the core network 110 to the access point 145 that provides connectivity via non-3GPP access types. The interworking function 165 is configured to modify or translate messages conveyed from the fixed access user equipment to the core network 110 so that the fixed access user equipment appears to be accessing the core network 110 according to 3GPP standards or protocols from the perspective of the core network 110. The interworking function 165 is also configured to modify or translate messages conveyed from the core network 110 to the fixed access user equipment so that the messages received by the fixed access user equipment conform to corresponding non-3GPP standards or protocols. The interworking function 165 supports interfaces with the AMF 115 and the UPF 125.

Figure 2:
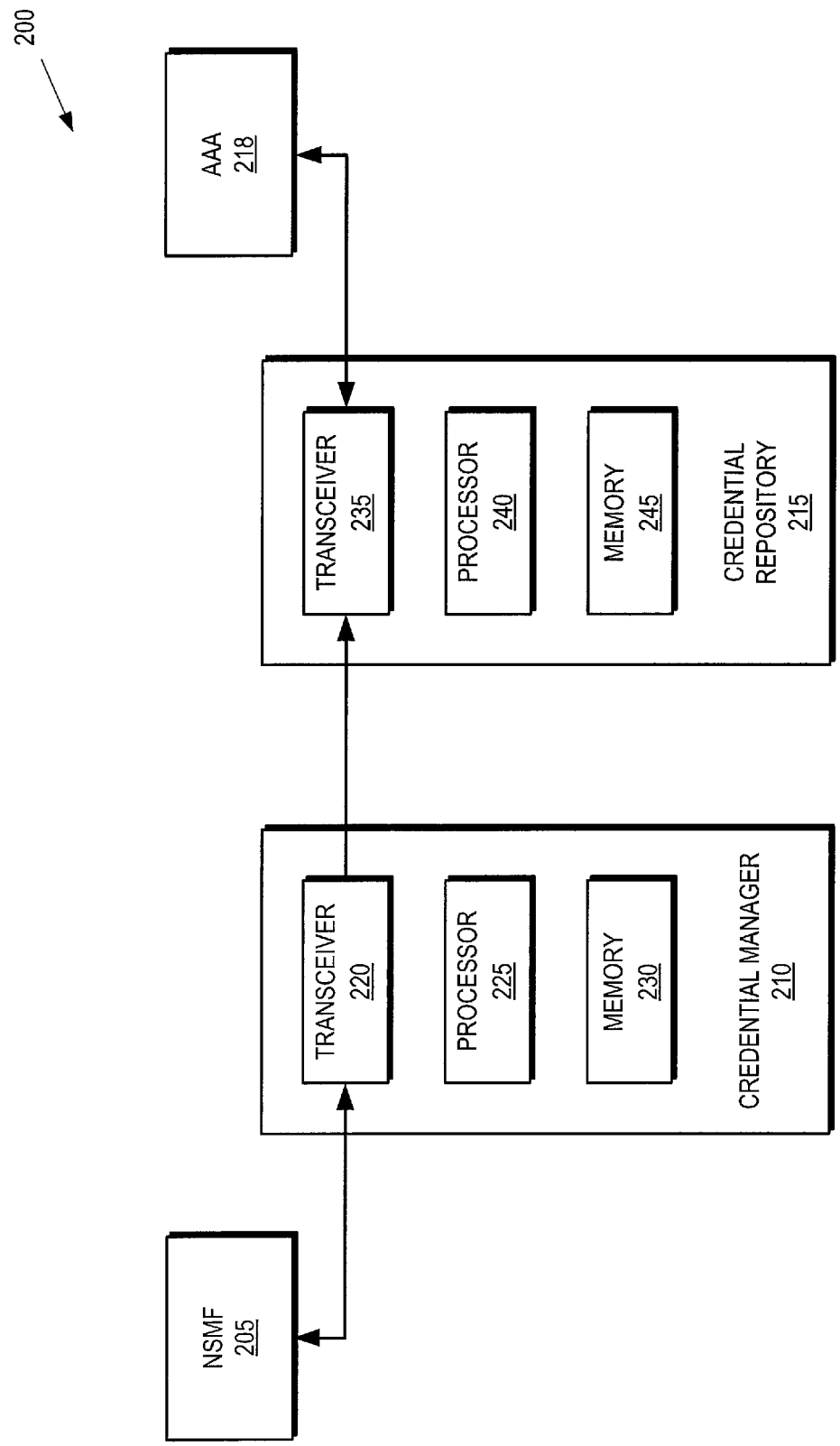
FIG. 2 is a block diagram of a processing system that implements management functions in a 5G network according to some embodiments.

The network system 100 operates in conjunction with entities in a management domain (such as shown in FIG. 2) that manage the access to network slices. For example, a network slice management function/communication service management function (NSMF/CSMF) can deploy a network slice in response to allocation of the network slice to a tenant. As used herein, the term "tenant" refers to a customer of a network slice, e.g., a vertical customer or enterprise that provides services to subscribers via one or more network slices. In some cases, the tenant provides a network slice for service users if an MNO offers management and orchestration capabilities such as network slice-as-a-service (NSaaS) to the tenant. In other embodiments, network slices are managed by a telecom operator as a service provider. As used herein, the term "subscriber" refers to a customer of the telecom operator (e.g., the MNO). Subscribers are also called end-users, which may be customers of tenants. Connections between the tenant and other entities that are not shown in the interest of clarity.

In response to deployment of the network slice (or association/dissociation of a tenant or a S-NSSAI), a slice-specific credential manager triggers management functions such as importing, updating, modifying, removing, storing, and protecting slice-specific credentials. For example, the credential manager can send a message to instruct the NSMF/CSMF to import slice-specific credentials for the network slice. The slice-specific credentials are not known to other network slices and provide isolation between the network slices supported by the network system 100. A repository stores the credentials and protects the credentials based on credential protection policies that are defined by a service profile of the network slice. The repository is implemented in at least one of the credential manager, an authentication, authorization, and accounting (AAA) server, or other location. Properties of the credentials are modified in response to a modification trigger and the credentials are withdrawn in response to a withdrawal trigger.

FIG. 2 is a block diagram of a processing system 200 that implements management functions in a management domain of a 5G network according to some embodiments. The management domain manages management functions such as a network slice management function (NSMF) 205 that is implemented in a network operator domain, and a credential manager 210, as well as other entities such as a credential repository 215 and an AAA server 218. In the illustrated embodiment, the NSMF 205, the credential manager 210, the credential repository 215, and the AAA server 218 are shown as distinct and separate entities. However, combinations of the NSMF 205, the credential manager 210, the credential repository 215, and the AAA server 218 are integrated into the same entity in some embodiments. For example, a single hardware platform can be used to implement the credential manager 210 and the AAA server 218. For another example, the credential repository 215 can be implemented in the credential manager 210 or the AAA server 218.

The slice specific credential manager 210 includes a transceiver 220 that supports communication with other entities including the NSMF 205 and the credential repository 215. The transceiver 220 may be implemented as a single integrated circuit (e.g., using a single ASIC or FPGA) or as a system-on-a-chip (SOC) that includes different modules for implementing the functionality of the transceiver 220. The credential manager 210 also includes a processor 225 and a memory 230. The processor 225 executes instructions stored in the memory 230 and stores information in the memory 230 such as the results of the executed instructions. In some embodiments, the memory 230 is used to implement the credential repository 215. The transceiver 220, the processor 225, and the memory 230 may therefore be configured to implement some embodiments of the techniques disclosed in detail below.

The credential repository 215 includes a transceiver 235 that supports communication with other entities including the credential manager 210. The transceiver 235 may be implemented as a single integrated circuit (e.g., using a single ASIC or FPGA) or as a system-on-a-chip (SOC) that includes different modules for implementing the functionality of the transceiver 235. The credential repository 215 also includes a processor 240 and a memory 245. The processor 240 may be used to execute instructions stored in the memory 245 and to store information in the memory 245 such as the results of the executed instructions and the slice-specific credentials provided by the credential manager 210. The transceiver 235, the processor 240, and the memory 245 may therefore be configured to implement some embodiments of the techniques disclosed in detail below.

The processing system 200 supports the management and distribution of slice-specific credentials to one or more network slices that provide user plane or control plane functions. Each network slice is a complete logical network that provides capabilities, which can vary from slice to slice. As discussed herein, tenants can concurrently provide services via multiple slices and multiple tenants can provide services via a single slice. User equipment can concurrently access services via multiple slices. Some embodiments of user equipment provide Network Slice Selection Assistance Information (NSSAI) parameters to the network to assist in selection of a slice instance for the user equipment. A single NSSAI may lead to the selection of several slices. The processing system 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3:
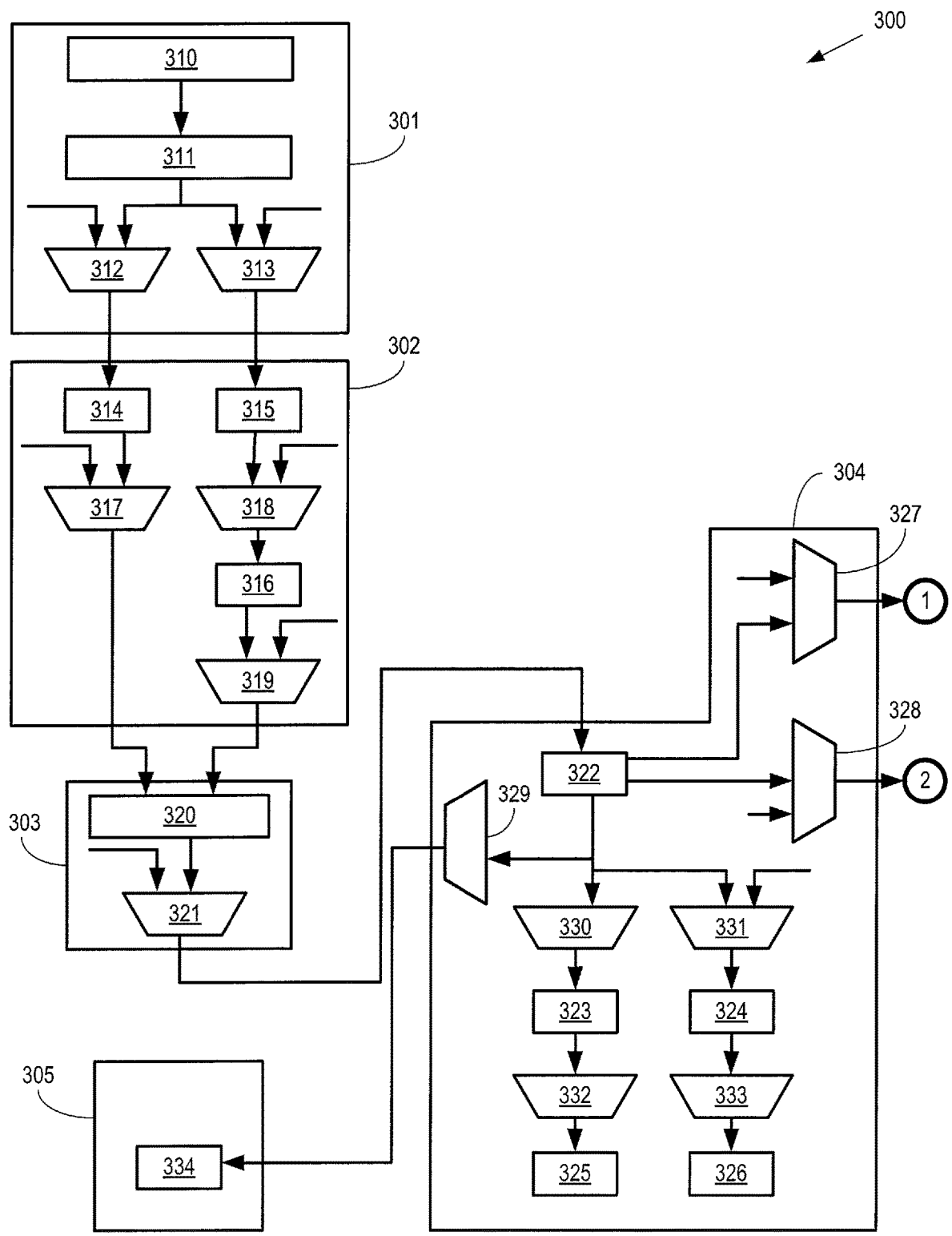
FIG. 3 is a block diagram of a first portion of a key distribution and key derivation scheme for 5G network nodes according to some embodiments.

FIG. 3 is a block diagram of a first portion 300 of a key distribution and key derivation scheme for 5G network nodes according to some embodiments. The first portion 300 is used to derive and distribute keys in some embodiments of the network system 100 shown in FIG. 1. The first portion 300 derives and distribute keys in a UDM 301, an AUSF 302, an SEAF 303, an AMF 304, and a N3IWF 305, which are configured and operate in the same or a similar manner to the corresponding entities in the network system 100 shown in FIG. 1.

The UDM 301 includes the keys 310, 311 and the key derivation functions (KDFs) 312, 313. The AUSF 302 includes the keys 314, 315, 316 and the KDFs 317, 318, 319. The SEAF 303 includes the key 320 and the KDF 321. The AMF 304 includes the keys 322, 323, 324, 325, 326 and the KDFs 327, 328, 329, 330, 331, 332, 333. The KDFs 327, 328 provide keys to the nodes 1 and 2, respectively. The N3IWF 305 includes the key 334. Derivation and distribution of the keys by the KDFs illustrated in FIG. 3 is disclosed in detail in FIG. 6.2.2-1 of the Third Generation Partnership Project (3GPP) Technical Specification (TS) 33.501, which is incorporated herein by reference in its entirety.

Figure 4:
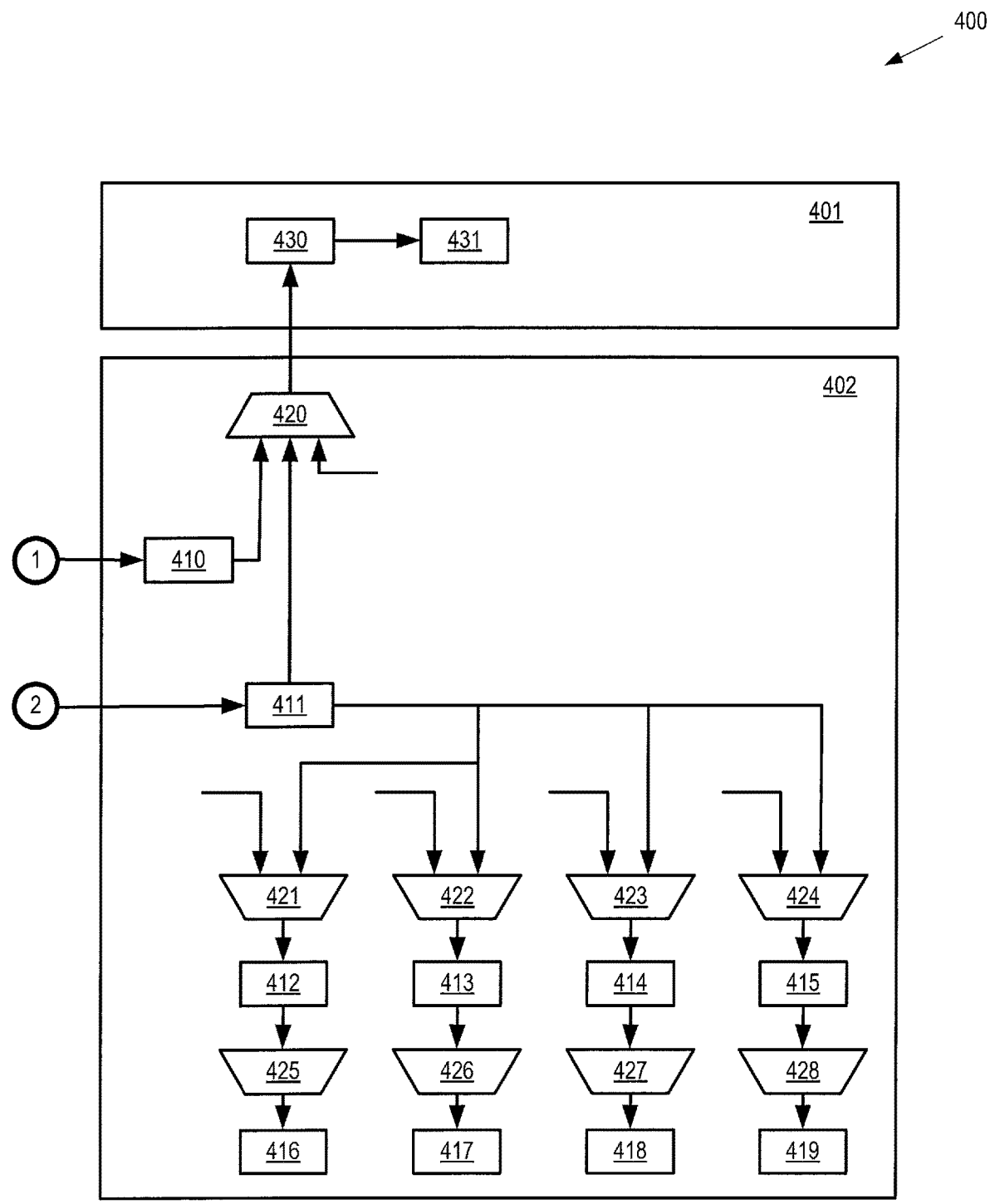
FIG. 4 is a block diagram of a second portion of a key distribution and key derivation scheme for 5G network nodes according to some embodiments.

FIG. 4 is a block diagram of a second portion 400 of a key distribution and key derivation scheme for 5G network nodes according to some embodiments. The second portion 400 is used in combination with the first portion 300 shown in FIG. 3 to derive and distribute keys in some embodiments of the network system 100 shown in FIG. 1. The second portion 400 derives and distribute keys in a first base station 401 and a second base station 402, which are also referred to as radio access networks or gNBs.

The first base station 401 includes the keys 410, 411, 412, 413, 414, 415, 416, 417, 418, 419. In some embodiments, the keys 410, 411 are received from the AMF 304 shown in FIG. 3 via the nodes 1 and 2. The first base station 401 includes the KDFs 420, 421, 422, 423, 424, 425, 426, 427, 428. The second base station 402 includes the keys 430, 431. Derivation and distribution of the keys by the KDFs illustrated in FIG. 4 are disclosed in detail in FIG. 6.2.2-1 of the 3GPP TS 33.501, which is incorporated herein by reference in its entirety.

Figure 5:
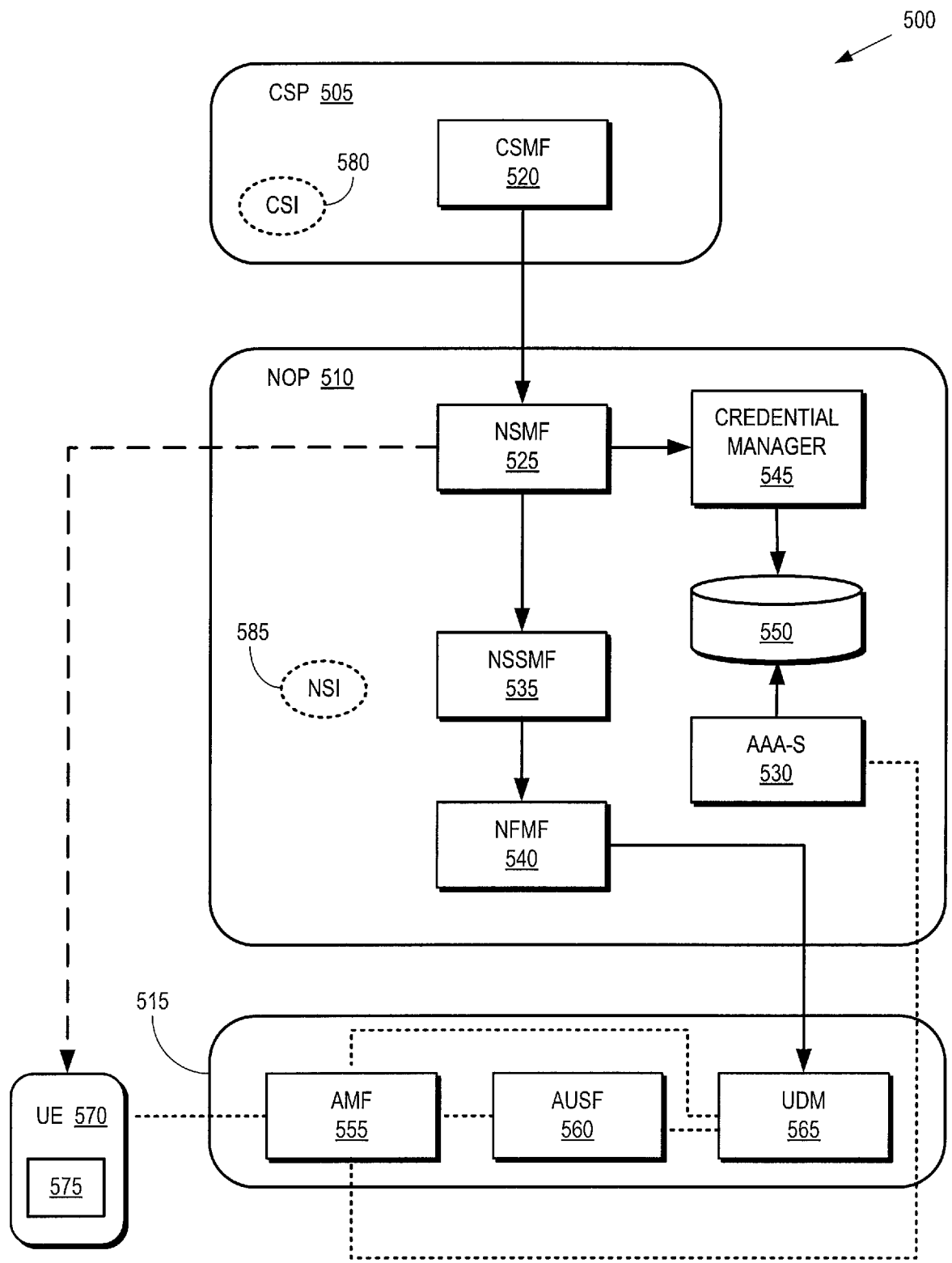
FIG. 5 is a block diagram of a set of network entities that implement network slice-specific credential management in a network operator internal mode according to some embodiments.

FIG. 5 is a block diagram of a set 500 of network entities that implement network slice-specific credential management in a network operator internal mode according to some embodiments. The set 500 includes a communication service provider (CSP) 505, a network operator (NOP) 510, and a communication network 515. Some embodiments of the communication network 515 are implemented using the network system 100 shown in FIG. 1. Management plane communication is indicated by the solid arrows, key distribution is indicated by the long dashed arrow, and signaling plane communication is indicated by the short dashed lines. The CSP 505 in the set 500 includes a CSMF 520. The NOP 510 includes an NSMF 525, an AAA server 530, an NSSMF 535, a NFMF 540, a credential manager 545, and a credential repository 550 to store network slice-specific credentials and protect the network slice-specific credentials according to a credential protection policy. The communication network 515 includes an AMF 555, an AUSF 560, and a UDM 565. Operation of the CSMF 520, the NSMF 525, the NSSMF 535, and the NFMF 540 are defined in 3GPP TR 28.801 and TS 28.533, which are incorporated herein by reference in their entireties. Operation of the AMF 555 and the UDM 565 are defined in 3GPP TS 23.501, which is incorporated herein by reference in its entirety. Operation of the AAA server is described in 3GPP TR 23.740, which is incorporated herein by reference in its entirety. The communication system also includes a user equipment 570 with an internal subscriber identity module (SIM) 575.

The set 500 is configured to provide network slice-specific credential management, authentication flag and traffic protection option, and the like to each S-NSSAI of service profile of a network slice. The S-NSSAI attributes stored in the UDM 565 are configured to allow provisioning (add, delete, update, etc.) of network slice-specific access control and protection from OAM. The AAA server 530 and the credential manager 545, and credential repository 550 are configured to support importing, updating, and deleting (withdrawing) network slice-specific (long-term) credentials with relevant protection. The credential manager 545 stores (and some cases protects according to a credential protection policy) the slice-specific credentials. The interface and function of NSMF 525 and the CSMF 520 are configured to support manage lifecycle of network slice-specific credentials during slice and tenant lifecycle and to support notification related to changes in slice/tenant specific credentials.

Figure 6:
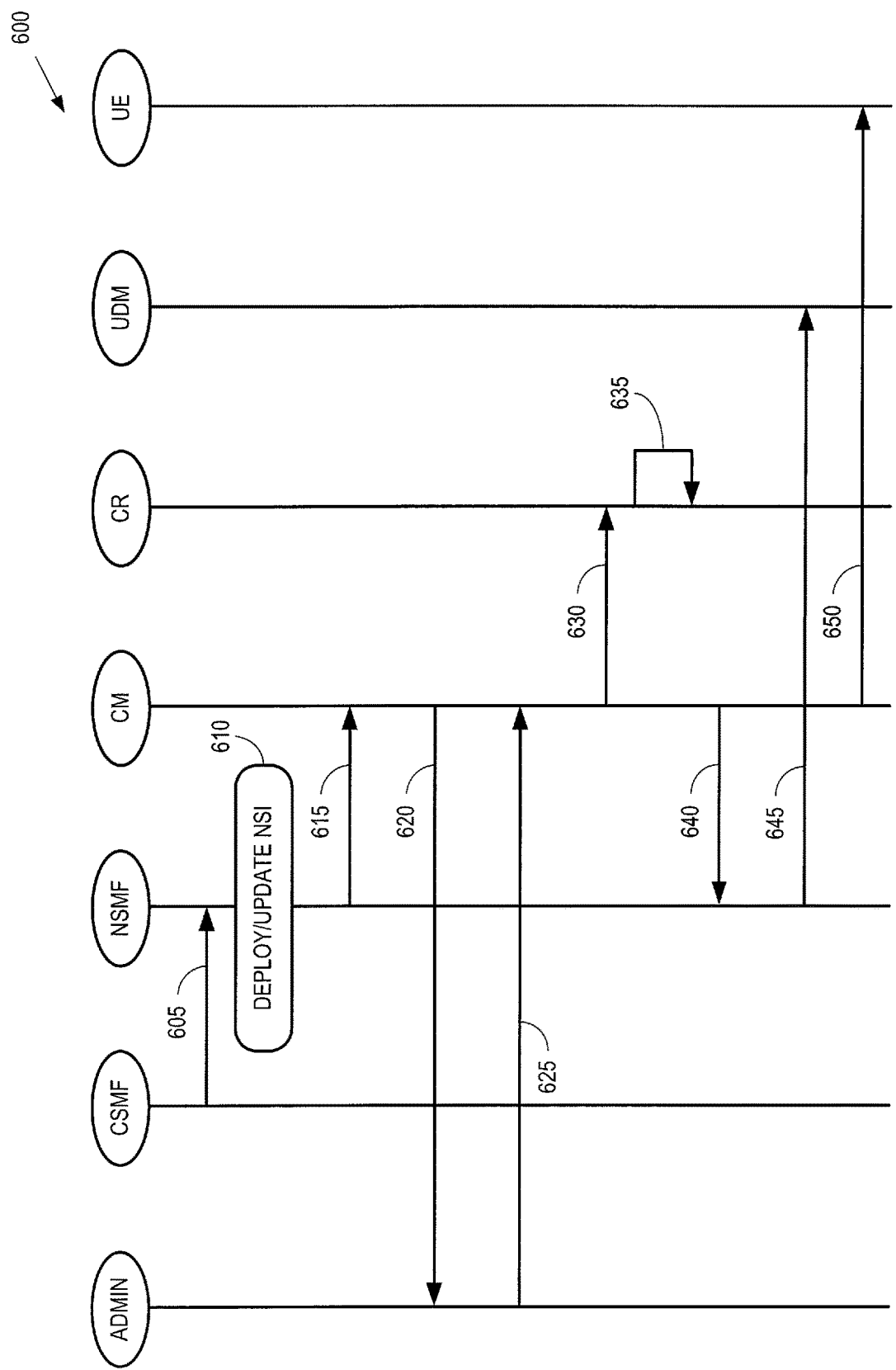
FIG. 6 shows message exchange that is used to import and distribute network slice-specific credentials in a network operator internal mode according to some embodiments.
Figure 7:
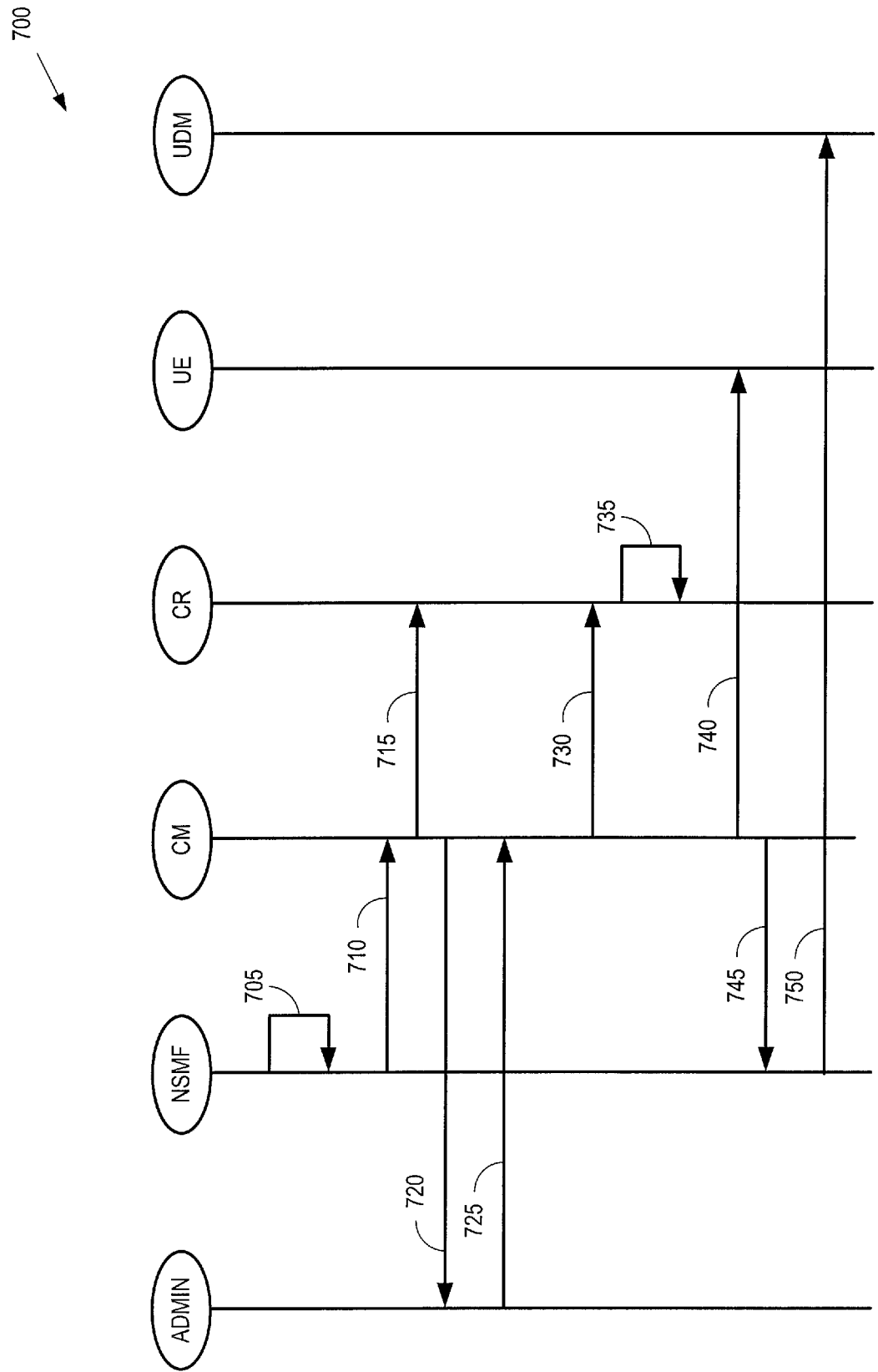
FIG. 7 shows message exchange that is used to update network slice-specific credentials in a network operator internal mode according to some embodiments.
Figure 8:
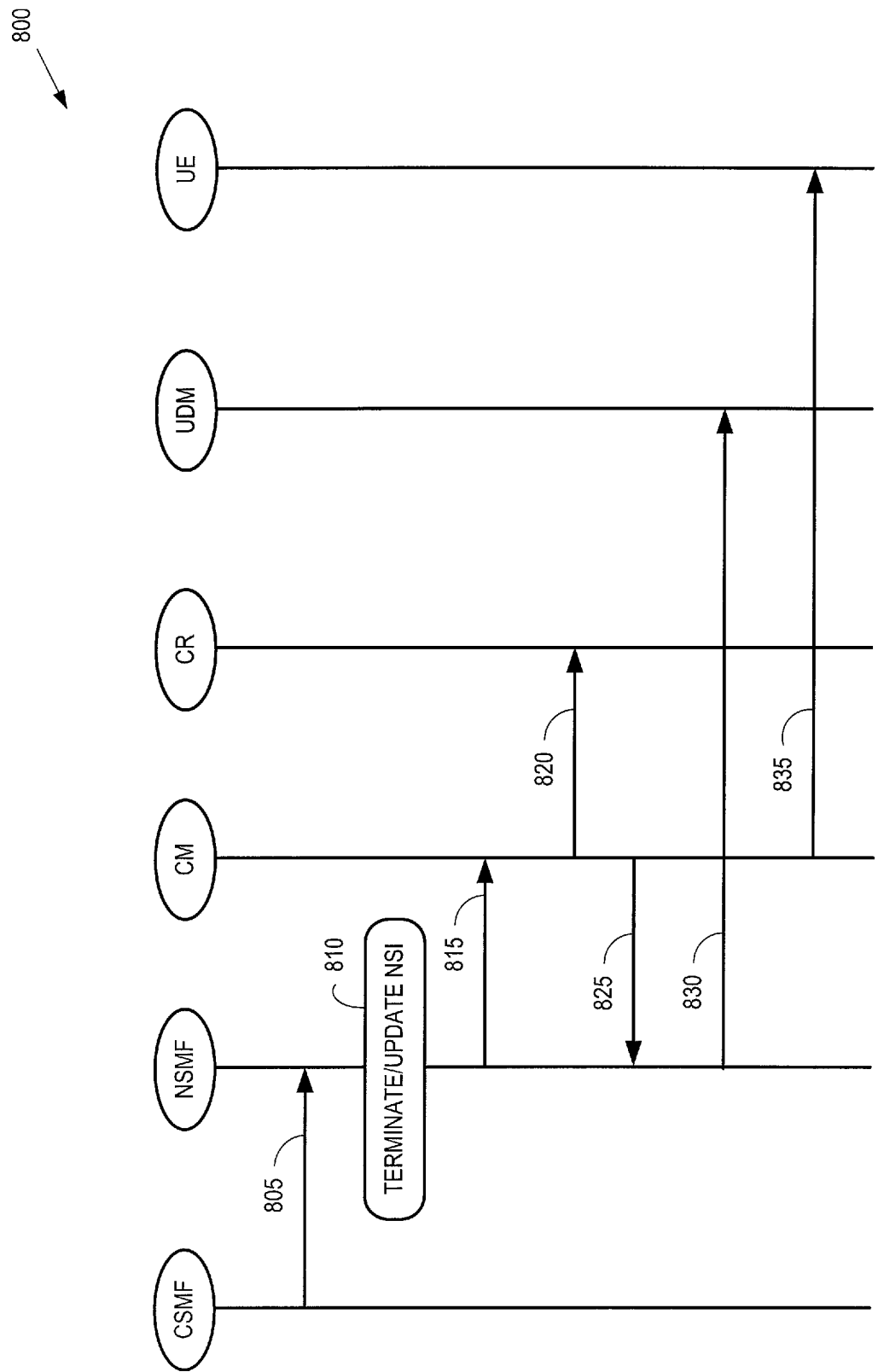
FIG. 8 shows message exchange that is used to withdraw network slice-specific credentials in a network operator internal mode according to some embodiments.

Operation of some embodiments of the set 500 is illustrated in FIGS. 6-8. For example, configuring, updating, and withdrawing network slice-specific credentials in response to allocation of a communication slice instance (CSI) 580 or a network slice instance (NSI) 585 are disclosed in FIGS. 6-8, respectively.

FIG. 6 shows message exchange 600 that is used to import and distribute network slice-specific credentials in a network operator internal mode according to some embodiments. The message exchange 600 is implemented in some embodiments of the set 500 shown in FIG. 5. Messages are exchanged between a security administrator (ADMIN), a CSMF, an NSMF, a credential manager (CM), a credential repository (CR), a UDM, and a user equipment (UE). A precondition of the message exchange 600 is that credential protection policies, an authentication flag option, and a traffic protection option for each network slice (e.g., as identified by a corresponding S-NSSAI) is designed and used to configure service profiles of the network slice instance (NSI) that is to be deployed.

The CSMF sends (at arrow 605) a request to allocate the NSI to the NSMF. At block 610, the NSMF successfully deploys/updates the NSI and then sends (at arrow 615) a message notifying the CM that the requested NSI was successfully deployed. In response to receiving the indication that the NSI was successfully deployed, CM sends (at arrow 620) a message notifying the ADMIN that the requested NSI was successfully deployed.

In response to successfully deploying the NSI, the security administrator of the network operator imports (at arrow 625) credentials for the network slice, e.g., for each S-NSSAI of the NSI, to the CM. A single NSI can be configured with multiple S-NSSAIs. A network slice instance is a management concept that reflects the network resources that are allocated to support service during deployment/scaling, etc. The S-NSSAI is a signaling concept that is used to allocate radio or transport resources to the UE during signaling procedure. Thus, an m:n mapping exists between the S-NSSAIs and the network slice instances. For example, when a tenant asks the NSMF to allocate a network slice to support a service type, the tenant adds a S-NSSAI list related to the service type to a service profile. Based on the service profile, the NSMF can deploy a new network slice to the tenant or reuse an existing network slice instance that supports the service type to the tenant. In the latter case, the network slice instance supports more than one S-NSSAI. The credentials are imported to the management system. Some embodiments of the credentials include security keys, password, certification, and other information, as discussed herein. If multiple tenants share the NSI, the NSMF groups the credentials pertinent per tenant per S-NSSAI.

The CM imports (at arrow 630) credentials to the CR using a secure method that is determined based on credential protection policies. In some embodiments, the credential protection policies per S-NSSAI of the NSI are defined in the service profiles. The credential protection policies that are used to protect the credentials per S-NSSAI (and, in some cases, the tenant) can be transferred to the CR in conjunction with the credentials, e.g., in the message indicated by the arrow 635.

The CR stores the imported credentials, as indicated by the arrow 635. The stored credentials are then protected based on the credential protection policies of the corresponding S-NSSAI or tenant. For example, the credential protection policies can define an encryption algorithm that is used to encrypt the stored credentials and decrypt the stored credentials when necessary.

The CM instructs (or triggers) the NSMF (as indicated by the arrow 640) to provide the slice-specific security parameters to configure other entities. In the illustrated embodiment, the NSMF configures other slice-specific security parameters in the UDM in response to receiving the instruction 640, as indicated by the arrow 645. In some embodiments, the NSMF configures the slice-specific security parameters via an NSSMF and a NFMF. The slice-specific security parameters include one or more of an authentication flag, a traffic protection option, access information for the AAA server, and the like. In some embodiments, a subscriber identifier for primary authentication or a user identifier for network slice-specific authentication are exchanged and synchronize between the AAA server and the UDM.

The CM also distributes (at arrow 650) the credentials to the appropriate user equipment, e.g., via NSMF, a core network and a radio network, or the like.

Post-conditions for the message exchange 600 include supporting AAA server to access CR for slice specific credentials, and core network function to access AAA server, further supporting network slice-specific authentication using the network slice-specific credentials. The post-conditions also include supporting network slice-specific traffic protection using security keys derived from the network slice-specific credentials. The protected traffic includes transport traffic, traffic over an air interface, and the like.

FIG. 7 shows message exchange 700 that is used to update network slice-specific credentials in a network operator internal mode according to some embodiments. The message exchange 700 is implemented in some embodiments of the set 500 shown in FIG. 5. Messages are therefore exchanged between a security administrator (ADMIN), an NSMF, a CM, a CR, a UDM, and a user equipment (UE). The message exchange 700 is initiated in response to detecting an update or modification trigger, e.g., detecting the trigger is a precondition for the message exchange 700. Examples of modification triggers include the network slice-specific credentials being compromised or lost, expiration of the network slice-specific credentials, a change in a security state of the NSI or a change in the security environment, a change in regulations or operator's security policies or tenant's security policies, a change in access information for the AAA server, and the like.

If the detected modification indicates that the authentication or protection policies are to be modified, the NSMF updates one or more policies for authentication or protection in the service profile of the corresponding S-NSSAI or tenant in response to detecting the modification trigger, as indicated by the arrow 705. In some cases, the NSMF informs the CM that the modification trigger has been detected, as indicated by the arrow 710. In some embodiments, the CM instructs the CR to update credential protection related policies for the impacted S-NSSAI or tenant of the NSI by sending a message to the CR, as indicated by the arrow 715.

The CM informs the security administrator for the operator that the credentials and properties associated with the network slice need to be replaced or updated in response to the modification trigger, as indicated by the arrow 720. In some embodiments, the CM transmits a message 720 that indicates that the credentials are compromised or have expired.

The security administrator transmits a message to the CM to update the credentials, e.g. by updating the credentials for the impacted S-NSSAI or tenant of the NSI, as indicated by the arrow 725. In response to receiving the updated credentials, the CM imports the updated credentials to the CR, as indicated by the arrow 730.

The CR updates the credentials if the information received from the CM includes updated or modified credentials, as indicated by the arrow 735. The CR also protects the credentials, as indicated by the arrow 735. The credential protection policy can be the previously established credential protection policy (if the information received from the CM does not include an updated policy) or a newly established credential protection policy (if the information received from the CM includes an updated policy).

The CM triggers (at arrow 740) distribution of the updated credentials to the appropriate user equipment, e.g., via NSMF, a core network and a radio network, or the like. However, the steps 720-740 may be omitted if no changes to the authentication or protection policies are detected.

The CM transmits a message 745 to trigger updating of the configuration information on the core network. In response to receiving the message 745, the NSMF updates configuration information including slice-specific security parameters in the UDM, as indicated by the arrow 750. In some embodiments, the NSMF updates the slice-specific security parameters via an NSSMF and a NFMF. The slice-specific security parameters include one or more of an authentication flag, a traffic protection option, access information for the AAA server, and the like. In some embodiments, a subscriber identifier for primary authentication or a user identifier for network slice-specific authentication are exchanged and synchronize between the AAA server and the UDM.

In some embodiments, a post condition for the message exchange 700 includes logging the updated behaviors for a subsequent audit.

FIG. 8 shows message exchange 800 that is used to withdraw network slice-specific credentials in a network operator internal mode according to some embodiments. The message exchange 800 is implemented in some embodiments of the set 500 shown in FIG. 5. Messages are exchanged between a CSMF, an NSMF, a CR, a UDM, and a user equipment (UE). The message exchange 800 is initiated in response to detecting a withdraw trigger, e.g., detecting the trigger is a precondition for the message exchange 800. Examples of withdraw triggers include termination of the network slice, disassociation of the supported NSSAI from the network slice, disassociation of the tenant from the network slice, and the like.

In the illustrated embodiment, the withdraw trigger is a message transmitted from the CSMF to the NSMF, as indicated by the arrow 805. The message requests de-allocation of an NSI, disassociation of an S-NSSAI from a supported list, or disassociation of a tenant based on a contract to utilize the NSI.

The NSMF terminates/updates the NSI at block 810. In response to successful termination/update of the NSI, the NSMF requests removal of the impacted credentials by sending a message to the CM, as indicated by the arrow 815. In response to receiving the request, the CM removes any previously stored credentials from the CR (as indicated by the arrow 820). The CM also transmits a message 825 to instruct the NSMF to update the configuration information of the core network.

In response to receiving the message 825, the NSMF updates slice-specific security parameters in the UDM, as indicated by the arrow 830. In some embodiments, the NSMF updates the slice-specific security parameters via an NSSMF and a NFMF. The slice-specific security parameters include one or more of an authentication flag, a traffic protection option, access information for the AAA, and the like. In some embodiments, a subscriber identifier for primary authentication or a user identifier for network slice-specific authentication are exchanged and synchronize between the AAA server and the UDM.

The CM triggers (at arrow 835) removal of the credentials from the appropriate user equipment, e.g., via NSMF, a core network and a radio network, or the like.

Post-conditions for the message exchange 800 include logging the termination, update, or modification behavior for a later audit and ensuring that the impacted user is no longer able to access the network slice surfaces associated with the NSI.

Figure 9:
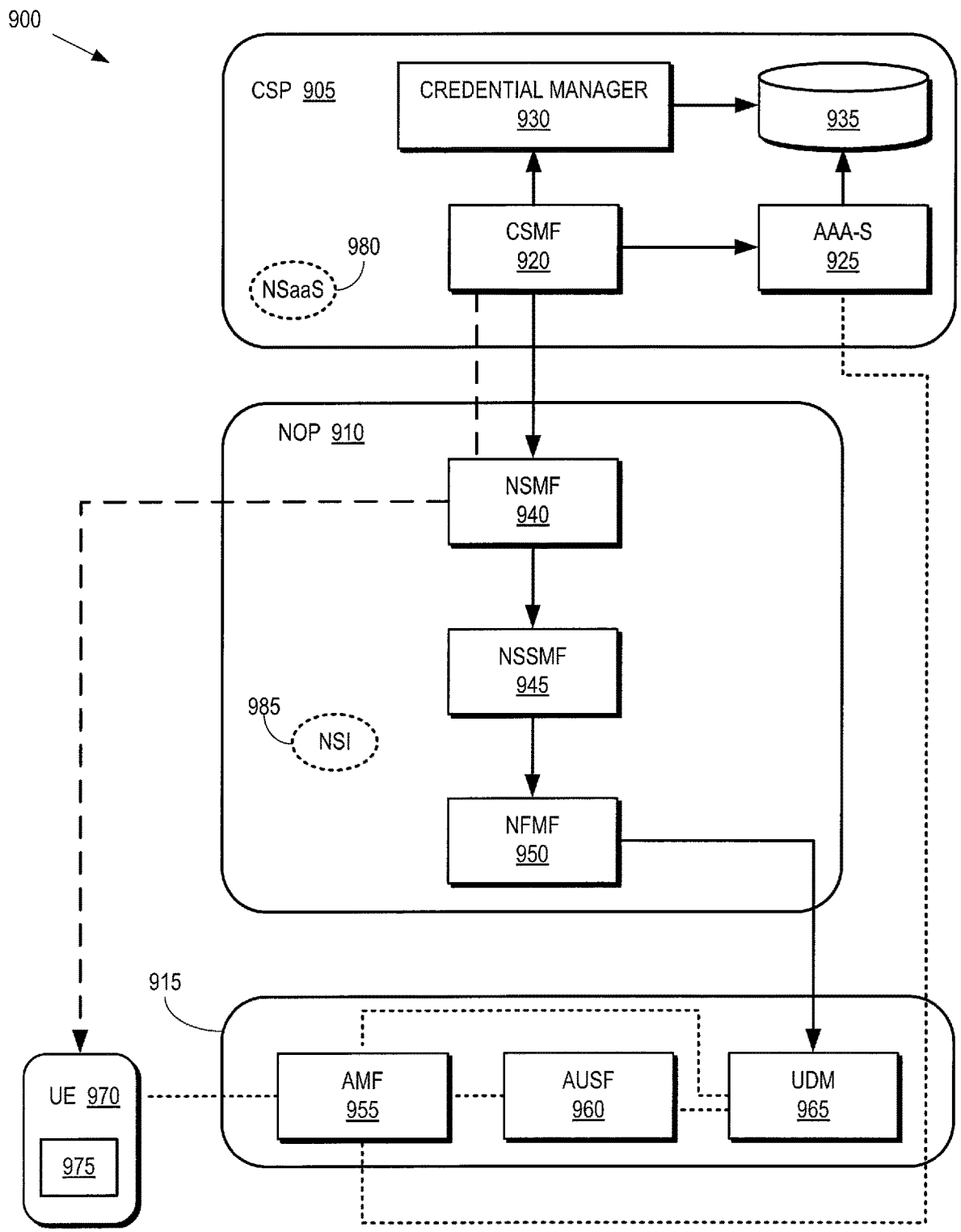
FIG. 9 is a block diagram of a set of network entities that implement network slice-specific credential management in a network slice-as-a-service scenario according to some embodiments.

FIG. 9 is a block diagram of a set 900 of network entities that implement network slice-specific credential management in a network slice-as-a-service scenario according to some embodiments. The set 900 includes a communication service provider (CSP) 905, a network operator (NOP) 910, and a communication network 915. Some embodiments of the communication network 915 are implemented using the network system 100 shown in FIG. 1. Management plane communication is indicated by the solid arrows, key distribution is indicated by the long dashed arrow, and signaling plane communication is indicated by the short dashed lines. The CSP 905 in the set 900 includes a CSMF 920, an AAA server 925, a credential manager 930, and a CR 935. The NOP 910 includes an NSMF 940, an NSSMF 945, and a NFMF 950. The communication network 915 includes an AMF 955, an AUSF 960, and a UDM 965. These entities operate in the same manner or a similar manner to the corresponding entities in the network system 100 shown in FIG. 1. The communication system also includes a user equipment 970 with an internal subscriber identity module (SIM) 975.

The set 900 is configured to provide network slice-specific credential management, authentication flag and traffic protection option, and the like to each S-NSSAI of service profile of a network slice. The S-NSAAI attributes stored in the UDM 965 are configured to allow provisioning (add, delete, update, etc.) of network slice-specific access control and protection from OAM. The AAA server 925 and the credential manager 930 are configured to support importing, updating, and deleting (withdrawing) network slice-specific (long-term) credentials with relevant protection. The credential repository 935 is configured to store (and in some cases protect according to the credential protection policies) the network slice-specific credentials. The interface and function of NSMF 940 and the CSMF 920 are configured to support managing a lifecycle of network slice-specific credentials during slice and tenant lifecycle and to support notification related to changes in slice/tenant specific credentials.

Operation of some embodiments of the set 900 is illustrated in FIGS. 10-13. For example, configuring, updating, and withdrawing network slice-specific credentials in response to allocation of a network slice-as-a-service (NSaaS) 980 or a network slice instance (NSI) 985 are disclosed in FIGS. 10-13, respectively.

Figure 10:
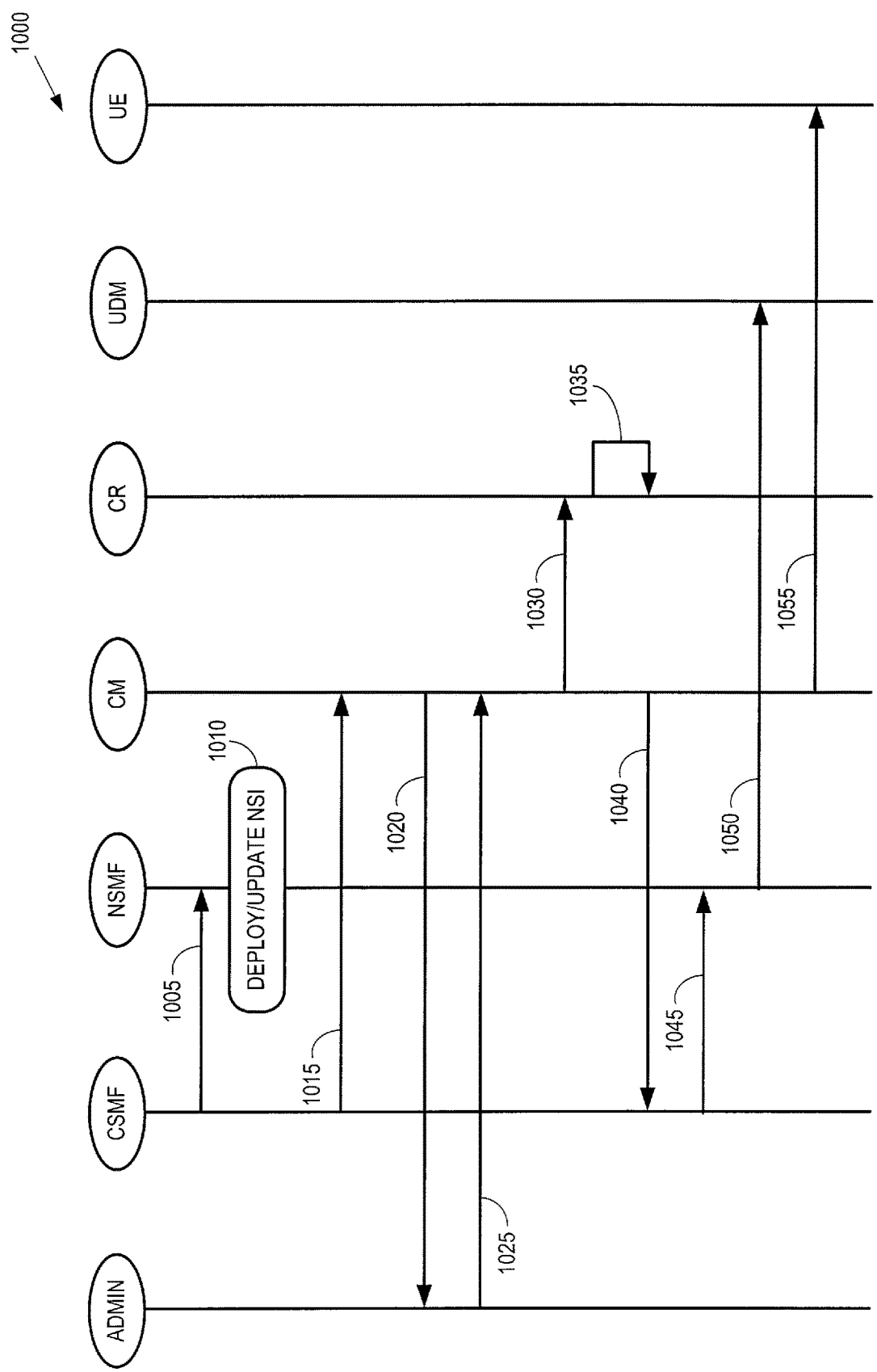
FIG. 10 shows message exchange that is used to import and distribute network slice-specific credentials in an NSaaS mode according to some embodiments.

FIG. 10 shows message exchange 1000 that is used to import and distribute network slice-specific credentials in a network slice-as-a-service (NSaaS) mode according to some embodiments. The message exchange 1000 is implemented in some embodiments of the set 900 shown in FIG. 9. Messages are therefore exchanged between an administrator (ADMIN), a CSMF, an NSMF, a CM, a CR, a UDM, and a user equipment (UE). A precondition of the message exchange 1000 is that credential protection policies, an authentication flag option, and a traffic protection option for each S-NSSAI are designed and used to configure service profiles of the network slice instance (NSI) that is to be deployed.

The CSMF sends a request 1005 to allocate the NSI to the NSMF. At block 1010, the NSMF successfully deploys/updates the NSI. The CSMF sends (at arrow 1015) a message notifying the CM that the requested NSI was successfully deployed. In response to receiving the message 1015, the CM sends (at arrow 1020) a message notifying the security administrator that the requested NSI was successfully deployed and requesting that the appropriate credentials be imported.

In response to successfully deploying the NSI, the security administrator of the tenant/communication service provider imports (at arrow 1025) credentials for the network slice, e.g., as indicated by the S-NSSAI of the NSI. The credentials are imported to the CM. Some embodiments of the credentials include security keys and other information, as discussed herein. If multiple tenants share the NSI, the NSMF groups the credentials pertinent per S-NSSAI.

The CM imports (at arrow 1030) the network slice-specific credentials to the CR using a secure method that is determined based on credential protection policies. In some embodiments, the credential protection policies are defined in the service profiles/network slice templates per S-NSSAI of the NSI. The credential protection policies that are used to protect the credentials per S-NSSAI (and, in some cases, the tenant) can be transferred to the CR in conjunction with the credentials, e.g., in the message indicated by the arrow 1030.

In the illustrated embodiment, the CR stores the imported credentials, as indicated by the arrow 1035. The stored credentials are then protected based on the credential protection policies of the corresponding S-NSSAI or tenant. For example, the credential protection policies can define an encryption algorithm that is used to encrypt the stored credentials and decrypt the stored credentials when necessary. However, storing the imported credentials in the CR is optional and is not necessarily implemented in some embodiments.

The CM instructs (or triggers) the CSMF (as indicated by the arrow 1040) to provide the slice-specific security parameters and credentials to other entities. In the illustrated embodiment, the CSMF informs the NSMF that the credentials have been imported to the CR, as indicated by the arrow 1045. In response, the NSMF configures other slice specific security parameter parameters in the UDM, as indicated by the arrow 1050. In some embodiments, the NSMF configures the access parameters via an NSSMF and a NFMF. The access parameters include one or more of an authentication flag, a traffic protection option, access information for the AAA server, and the like. In some embodiments, a subscriber identifier for primary authentication or a user identifier for network slice-specific authentication are exchanged and synchronize between the AAA server and the UDM.

The CM triggers (at arrow 1055) distribution of the credentials to the appropriate user equipment, e.g., via NSMF, a core network and a radio network, or the like.

Post-conditions for the message exchange 1000 include supporting network slice-specific authentication using the network slice-specific credentials. The post-conditions also include supporting network slice-specific traffic protection using security keys derived from the network slice-specific credentials. The protected traffic includes transport traffic, traffic over an air interface, and the like.

Figure 11:
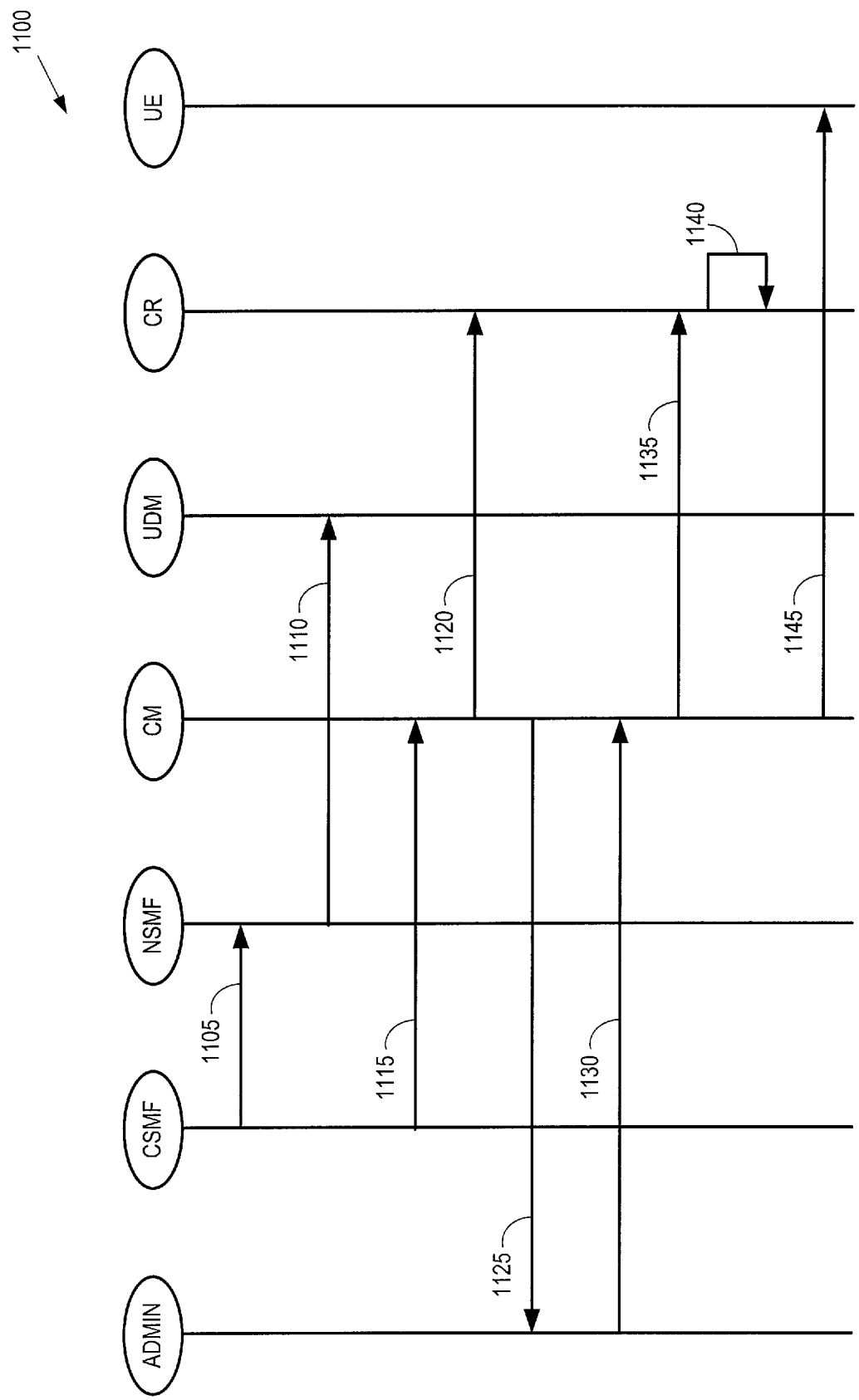
FIG. 11 shows message exchange that is used to update network slice-specific credentials in an NSaaS mode according to some embodiments.

FIG. 11 shows message exchange 1100 that is used to update network slice-specific credentials in an NSaaS mode according to some embodiments. The message exchange 1100 is implemented in some embodiments of the set 900 shown in FIG. 9. Messages are exchanged between an administrator (ADMIN), a CSMF, an NSMF, a CM, a CR, a UDM, and a user equipment (UE). The message exchange 1100 is initiated in response to detecting an update or modification trigger, e.g., detecting the trigger is a precondition for the message exchange 1100. Examples of modification triggers include the network slice-specific credentials being compromised or lost, expiration of the network slice-specific credentials, a change in a security state of the NSI or a change in the security environment, a change in regulations or operator's security policies or tenant's security policies, a change in access information for the AAA server or the UDM, and the like.

If the modification includes a change in an authentication or protection policy, the CSMF sends a message to the NSMF indicating that one or more policies for authentication or protection should be updated in the service profile of the corresponding NSSAI or tenant in response to detecting the modification trigger, as indicated by the arrow 1105. However, the steps 1110-1120 may be omitted if no changes to the authentication or protection policies are detected. In response to the modification trigger, the NSMF configures other slice specific security parameter parameters in the UDM, as indicated by the arrow 1110. In some embodiments, the NSMF configures the access parameters via an NSSMF and a NFMF. The access parameters include one or more of an authentication flag, a traffic protection option, access information for the AAA server, and the like. In some embodiments, a subscriber identifier for primary authentication or a user identifier for network slice-specific authentication are exchanged and synchronize between the AAA server and the UDM.

In response to the modification trigger, the CSMF also sends a message to the CM indicating that credential protection related policies for the impacted S-NSSAI or tenant of the NSI need to be updated, as indicated by the arrow 1115. In response to receiving the message 1115, the CM transmits a message 1120 triggering modification of the credential protection related policies stored on the CR.

If the modification indicates that the credentials are compromised or have expired, the CM transmits a message 1125 to the security administrator indicating that the credentials are compromised or have expired. In response to receiving the message 1125, the security administrator transmits a message to the CM to update the credentials, e.g. by updating the credentials for the impacted S-NSSAI or tenant of the NSI, as indicated by the arrow 1130. In response to receiving the updated credentials, the CM imports the updated credentials to the CR, as indicated by the arrow 1135. The CR updates and stores the credentials, as indicated by the arrow 1140. The updated/modified credentials can also be protected according to the credential protection related policies.

The CM triggers (at arrow 1145) distribution of the credentials to the appropriate user equipment, e.g., via NSMF, a core network and a radio network, or the like.

In some embodiments, a post condition for the message exchange 1100 includes logging the updated behaviors for a subsequent audit.

Figure 12:
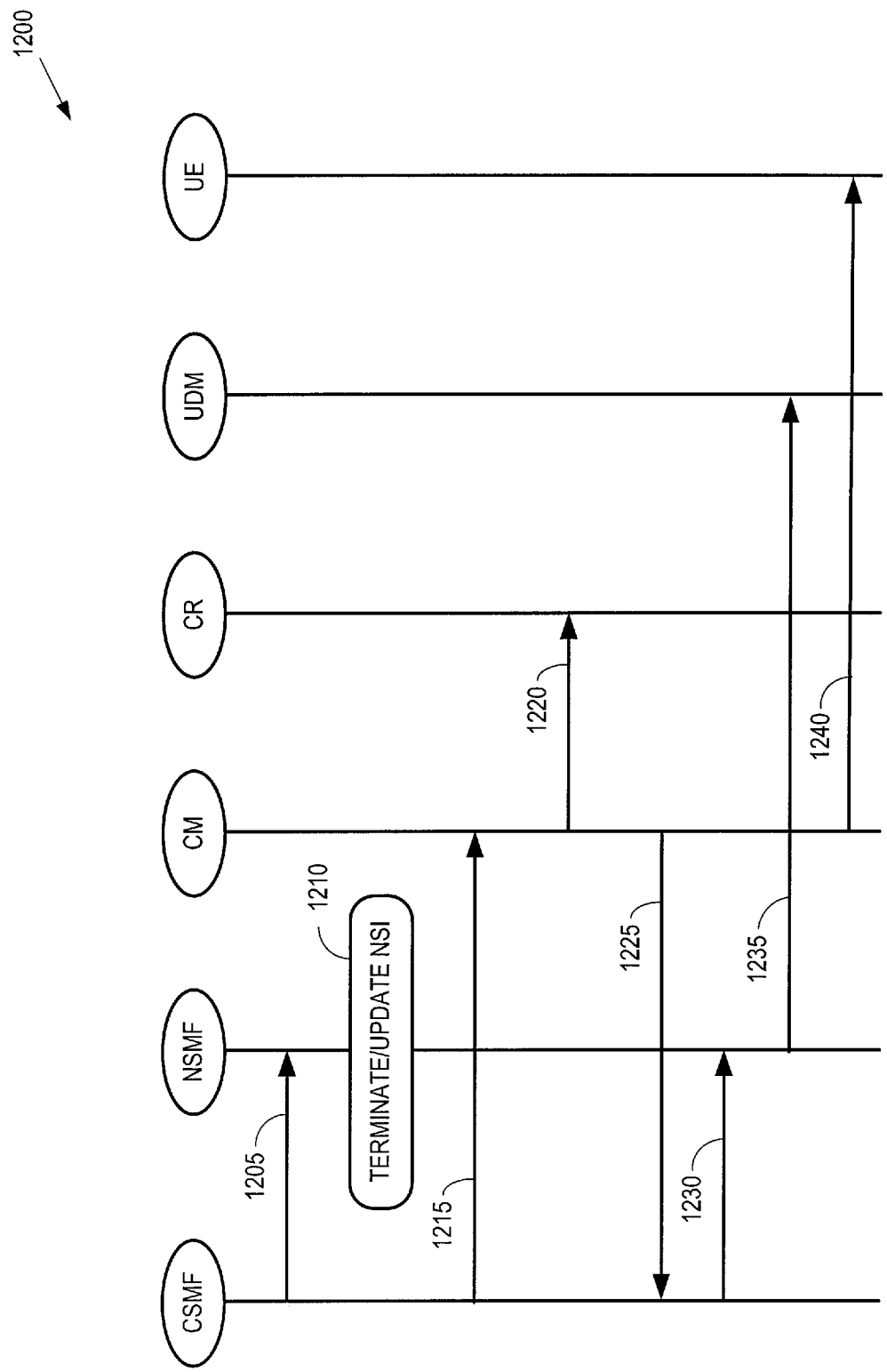
FIG. 12 shows message exchange that is used to withdraw network slice-specific credentials in an NSaaS mode according to some embodiments.

FIG. 12 shows message exchange 1200 that is used to withdraw network slice-specific credentials in an NSaaS mode according to some embodiments. The message exchange 1200 is implemented in some embodiments of the set 900 shown in FIG. 9. Messages are exchanged between a CSMF, an NSMF, a CM, a CR, a UDM, and a user equipment (UE). The message exchange 1200 is initiated in response to detecting a withdraw trigger, e.g., detecting the trigger is a precondition for the message exchange 1200. Examples of withdraw triggers include termination of the network slice, disassociation of the supported S-NSSAI from the network slice, removal of the tenant from the network slice, and the like.

In the illustrated embodiment, the withdraw trigger is a message transmitted from the CSMF to the NSMF, as indicated by the arrow 1205. The message requests de-allocation of an NSI, removal of an S-NSSAI from a supported list, or removal of a tenant based on a contract to utilize the NSI.

The NSMF terminates/updates the NSI at block 1210. In response to successful termination of the NSI, the CSMF requests removal of the impacted credentials from the AAA server by sending a message to the CM, as indicated by the arrow 1215. In response to receiving the request, the CM transmits a message 1220 instructing the CR to remove the impacted credentials.

The CM transmits a message 1225 informing the CSMF that the credentials have been removed. In response, the CSMF transmits a message 1230 to the NSMF indicating that the core network configuration is to be updated. In response to receiving the message 1230, the NSMF configures slice specific security parameter parameters in the UDM, as indicated by the arrow 1235. In some embodiments, the NSMF configures the access parameters via an NSSMF and a NFMF. The access parameters include one or more of an authentication flag, a traffic protection option, access information for the AAA server, and the like. In some embodiments, a subscriber identifier for primary authentication or a user identifier for network slice-specific authentication are exchanged and synchronize between the AAA server and the UDM.

The CM triggers (at arrow 1240) removal of the credentials from the appropriate user equipment, e.g., via NSMF, a core network and a radio network, or the like.

Post-conditions for the message exchange 1200 include logging the termination, update, or modification behavior for a later audit and ensuring that the impacted user is no longer able to access the network slice surfaces associated with the NSI.

Figure 13:
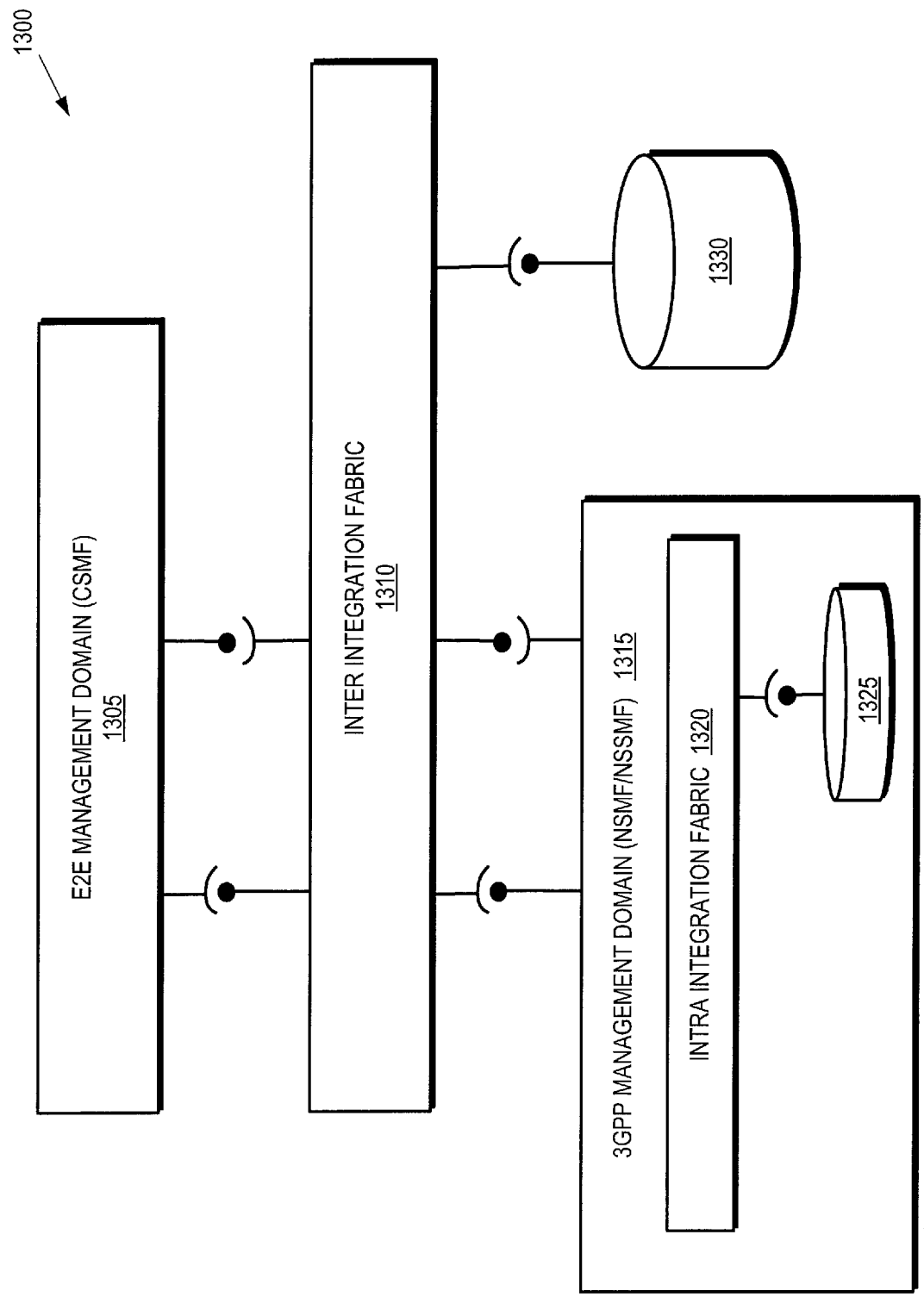
FIG. 13 is a block diagram of a communication and network system that maps credential management to a reference architecture according to some embodiments.

FIG. 13 is a block diagram of a communication and network system 1300 that maps credential management to a reference architecture according to some embodiments. In the illustrated embodiment, the reference architecture is an ETSI zero touch network and service management (ZSM) reference architecture. The communication system 1300 includes an end-to-end (E2E) management domain 1305 that implements a CSMF. The communication system 1300 also includes an inter-integration fabric 1310 and a 3GPP management domain 1315 that implements an NSMF and an NSSMF. The 3GPP management domain 1315 includes an intra-integration fabric 1320 and a data service 1325 which can be used to store slice specific credentials in network slice in network operator internal mode. The inter-integration fabric 1310 is connected to a cross domain data service 1330 which can be used to store slice specific credentials in network slice as a service mode.

Some embodiments of the techniques disclosed herein have advantages over conventional practice. For network slice specific access authentication and authorization, the operator (in Network Slice in network operator internal mode) or slice's tenants (in Network Slice as a Service mode) are able to deploy their own slice related keys flexibly according to specific security policies. Furthermore, the network slice specific keys are distributed, updated, or withdrawn based on the change of (industrial) regulation requirements, change of operators' or tenants' polices, lifecycle status of the slice, lifetime of the key and security status of the certificate and the slice. In addition, the operator is able to manage credentials per tenant in case there are several tenants using a single slice. Furthermore, tenants or operators are able to select keys to protect the traffic of a specific slice.

When designing a network slice by MNO, NSMF/CSMF provides capabilities to add slice specific key requirements (e.g. the credential protection policy, traffic protection policy, authentication policy, etc.) into the service profile.

After deploying a slice, the credential manager or NSMF/CSMF provides capabilities to import a batch of keys (or other credentials) for the slice to the slice specific credential repository and to configure the security rules to protect the credentials according to defined security policies. The credential manager is then able to trigger configuring the 5G core network through NSMF, NSSMF and NFMF to support slice-based authentication and traffic protection, e.g., by configuring an authentication flag or a traffic protection flag on specific S-NSSAI in UDM. The NSMF/CSMF/CM then triggers distributing the slice specific keys to mobile device of the subscribers through core and radio network.

The credential manager or the NSMF/CSMF may automatically trigger the modification of credentials for the network slice according to security policies, security status of the credentials, and the like. In addition, the credential manager/NSMF/CSMF may automatically trigger an update of 5G Core network functions and mobile device (UE) accordingly the credential manager/CSMF/NSMF may trigger to withdraw the credentials, from the user equipment once the slice is terminated.

Credential manager/CSMF/NSMF may group the credentials for tenants of a single slice and manage the credentials based on tenant, e.g. import, update, withdraw the credentials for a tenant when create, change or delete a tenant.

Some embodiments of the techniques disclosed herein are applied to build secure transport for the slice. Some embodiments of the techniques disclosed herein are also applicable to the case that a single tenant uses multiple slices for building communication services and/or a slice across multiple operators.

The following are examples of use cases that require that the user plane is protected with network slice specific keys as disclosed herein to avoid leaking slice traffic information to other slices, and use cases that require managing slice-specific credentials and related policies:

A subscriber's UE is connected to two slices, one for financial transactions, another for chat purposes. The first slice ensures high confidentiality hence the slice requires encryption of user traffic with more secure algorithms. while the slice for chat just need encryption with simpler algorithms which is reflected in processor time. In general, a single UE can connect to maximum of 8 (different) slices, which may have different requirements for encryption.

There's no mechanism for MNOs (as slice provider) and tenants (as slice customer) to manage the keys for slices according to the slice lifecycle including slice design, deployment, modification and termination. In conventional network slicing, the lifetime of keys for network slices in a single gNB are the same. However, tenants like large corporations may not want to use the key, which is derived from the 3GPP network authentication key. The tenants may have a policy that requires that they use their own independently generated key (e.g. slice specific key) but still require the use of features provided by the 3GPP network to distribute and manage such a key.

Furthermore, the concept of secondary authentication and authorization for network slicing has been discussed in 3GPP TR 23.740 and 3GPP TR 33.813. Based on the proposed solution of the studies, MNOs as slice providers and tenants as slice customer may require access control to network slices with additional authorization and authentication. After primary authentication, slice authentication might be needed to control the access to the specific slice services and to support tenant and user centric identifier and authentication. The solution considers an AAA server deployed in a public land mobile network (PLMN) or in a third-party network that allows slice-specific secondary authentication and authorization of users who have the right of access to certain slices. The AAA Server handles the User IDs and credentials for a secondary authentication at a non 3GPP User ID level, after the UE has been authenticated by the 3GPP system for PLMN access. For the slice-specific secondary authentication and authorization, the UE needs to be provided with the necessary credentials and algorithms necessary to authenticate itself with the AAA Server.

In addition, UEs used for IoT may only implement few protocols due to memory and calculation limitations. If specific UEs are using protocols for primary authentication, it could imply that these UEs are not capable to implement other protocols required by tenants. It would be beneficial for IoT devices to have a single authentication for slices.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
(a) hardware-only circuit implementations (such as implementations and only analog and/or digital circuitry) and
(b) combinations of hardware circuits and software, such as (as applicable):
  (i) a combination of analog and/or digital hardware circuit(s) with software/firmware and
  (ii) any portions of a hardware processor(s) with software (including digital signal processor(s), software, and memory(ies) that work together to cause an apparatus, such as a mobile phone or server, to perform various functions) and
(c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
    at least one processor; and
    at least one memory including computer program code;
    the at least one memory and the computer program code configured to, with the at least one processor, cause the apparatus at least to perform:
    importing credentials for a network slice to an authentication, authorization, and accounting (AAA) server in response to deployment of the network slice, wherein the credentials are not known to other network slices;
    storing the credentials in a repository; and
    protecting the credentials based on credential protection policies that are defined by a service profile of the network slice.

2. The apparatus of claim 1, wherein the at least one memory and the computer program code are configured to, with the at least one processor, cause the apparatus at least to perform:
    modifying at least one property of the credentials in response to a modification trigger; and
    withdrawing the credentials in response to a withdrawal trigger.

3. The apparatus of claim 1, wherein the at least one processor is implemented in a credential manager and wherein the repository is implemented in at least one of the credential manager and an authentication, authorization, and accounting (AAA) server.

4. The apparatus of claim 1, wherein the credentials stored in the repository are protected according to at least one of encryption, access control, storage isolation, and integrity protection policies associated with a Single-Network Slice Selection Assistance Information (S-NSSAI) as defined in the service profile of the network slice.

5. The apparatus of claim 2, wherein the modification trigger comprises at least one of compromising the credentials, loss of the credentials, expiration of the credentials, a change in a security state or environment of the network slice, a change in a regulation or policy.

6. The apparatus of claim 2, wherein the property of the credentials comprises at least one of a value of the credentials, the credential protection policy, usage of the credentials for at least one of authentication and protecting traffic associated with the S-NSSAI, and subscriber authentication flags associate with the S-NSSAI that indicate whether primary or secondary authentication is used.

7. The apparatus of claim 2, wherein the processor is configured to trigger, in response to the modification trigger, modification of at least one of network slice authentication flags, traffic protection options on a network function, and wherein the processor is configured to trigger the modification of the credentials on a user equipment in response to the modification trigger.

8. The apparatus of claim 2, wherein the withdrawal trigger comprises at least one of termination of the network slice, disassociation of the S-NSSAI from the network slice, and disassociation of the tenant from the network slice.

9. The apparatus of claim 2, wherein the processor is configured to trigger, in response to the withdrawal trigger, update of at least one of network slice authentication flags, traffic protection options, and wherein the processor is configured to trigger removal of the credentials from a user equipment in response to the withdrawal trigger.

10. A method comprising:
importing credentials for a network slice in response to deployment of the network slice, wherein the credentials are not known to other network slices;
storing the credentials in a repository; and
protecting the credentials based on credential protection policies that are defined by a service profile of the network slice.

11. The method of claim 10, wherein the repository is implemented in at least one of a credential manager and an authentication, authorization, and accounting (AAA) server.

12. The method of claim 10, wherein protecting the credentials comprises protecting the credentials according to at least one of encryption, access control, storage isolation, and integrity protection policies associated with a Single-Network Slice Selection Assistance Information (S-NSSAI) defined in the service profile of the network slice.

13. The method of claim 10, further comprising:
triggering configuration of at least one of network slice authentication flags, traffic protection options on a network function; and
providing the credentials to a user equipment to access services via the network slice.

14. The method of claim 10, further comprising:
modifying at least one property of the credentials in response to a modification trigger.

15. The method of claim 14, wherein the modification trigger comprises at least one of compromising the credentials, loss of the credentials, expiration of the credentials, a change in a security state or environment of the network slice, a change in a regulation or policy.

16. The method of claim 14, wherein the property of the credentials comprises at least one of a value of the credentials, the credential protection policy, usage of the credentials for at least one of authentication and protecting traffic associated with a Single-Network Slice Selection Assistance Information (S-NSSAI) and subscriber authentication flags associated with the S-NSSAI that indicate whether primary or secondary authentication is used.

17. The method of claim 14, further comprising:
triggering, in response to the modification trigger, modification of at least one of network slice authentication flags, traffic protection options on a network function; and
triggering the modification of the credentials from a user equipment in response to the modification trigger.

18. The method of claim 10, further comprising:
withdrawing the credentials in response to a withdrawal trigger.

19. The method of claim 18, wherein the withdrawal trigger comprises at least one of termination of the network slice, disassociated of the S-NSSAI from the network slice, and disassociated of the tenant from the network slice.

20. The method of claim 18, further comprising:
triggering, in response to the withdrawal trigger, modification of at least one of network slice authentication flags, traffic protection options on a network function; and
triggering removal of the credentials from a user equipment in response to the withdrawal trigger.

* * * * *